(12) United States Patent
Jeon et al.

(10) Patent No.: US 9,024,592 B2
(45) Date of Patent: May 5, 2015

(54) AUXILIARY POWER SUPPLY AND USER DEVICE INCLUDING THE AUXILIARY POWER SUPPLY

(75) Inventors: Sang-hun Jeon, Suwon-si (KR); Ho-jun Shim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 642 days.

(21) Appl. No.: 13/431,474

(22) Filed: Mar. 27, 2012

(65) Prior Publication Data

US 2012/0268080 A1 Oct. 25, 2012

(30) Foreign Application Priority Data

Apr. 25, 2011 (KR) .................. 10-2011-0038441

(51) Int. Cl.
*H02J 7/00* (2006.01)
*G06F 1/26* (2006.01)
*G06F 1/30* (2006.01)
*H02J 7/34* (2006.01)

(52) U.S. Cl.
CPC ............. *G06F 1/263* (2013.01); *H02J 7/345* (2013.01); *G06F 1/30* (2013.01)

(58) Field of Classification Search
CPC combination set(s) only.
See application file for complete search history.

(56) References Cited

U.S. PATENT DOCUMENTS

| | | | |
|---|---|---|---|
| 6,424,156 B1* | 7/2002 | Okamura | 324/426 |
| 7,485,383 B2* | 2/2009 | Aoyagi et al. | 429/431 |
| 2008/0218176 A1* | 9/2008 | Ohashi et al. | 324/548 |
| 2009/0009144 A1* | 1/2009 | Hoshikawa et al. | 320/166 |
| 2009/0024265 A1* | 1/2009 | Kortschak et al. | 701/22 |
| 2009/0119034 A1* | 5/2009 | Oohasi et al. | 702/57 |
| 2009/0266630 A1* | 10/2009 | Soma et al. | 180/65.265 |
| 2011/0031811 A1* | 2/2011 | Park et al. | 307/66 |
| 2012/0062187 A1* | 3/2012 | Shim | 320/167 |

FOREIGN PATENT DOCUMENTS

| | | |
|---|---|---|
| JP | 2001-028844 | 1/2001 |
| KR | 1996-0005107 | 2/1996 |
| KR | 2010-0065999 A | 6/2010 |

* cited by examiner

*Primary Examiner* — Drew A Dunn
*Assistant Examiner* — Steve T Chung
(74) *Attorney, Agent, or Firm* — Myers Bigel Sibley & Sajovec, PA

(57) ABSTRACT

Auxiliary power supplies include a capacitor (e.g., super capacitor) and a capacitor charging circuit, which is configured to provide a charging current to a first terminal of the capacitor. Enhanced failure detection is provided by a capacitor monitoring circuit, which may be electrically coupled to at least one terminal of the capacitor. The capacitor monitoring circuit is configured to detect when the capacitor is malfunctioning in an open condition as well as when the capacitor is malfunctioning in a short condition.

19 Claims, 23 Drawing Sheets

FIG. 21
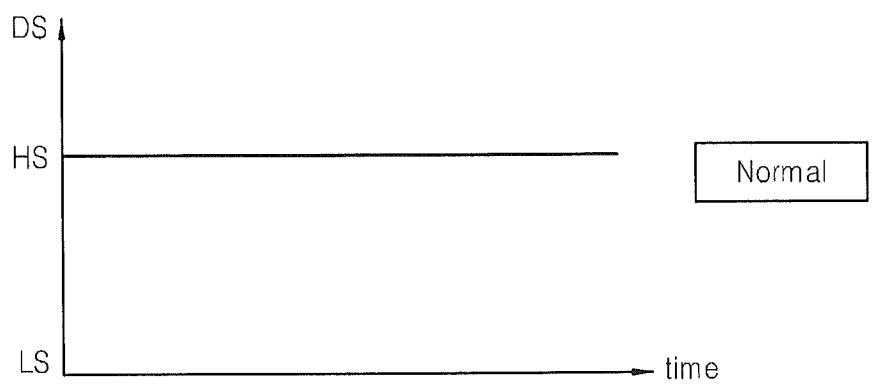
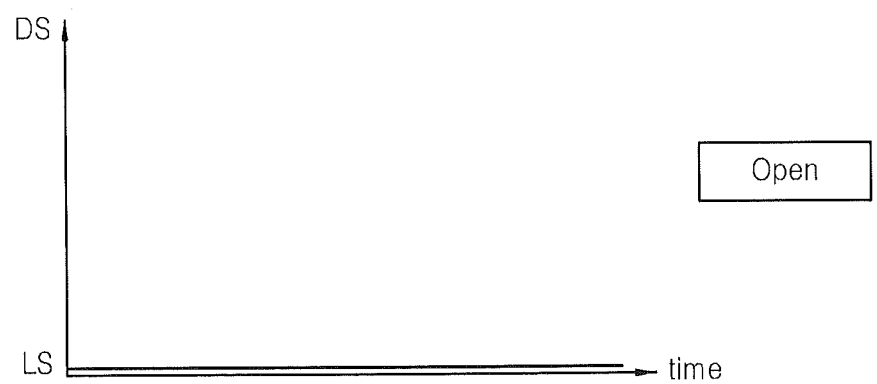
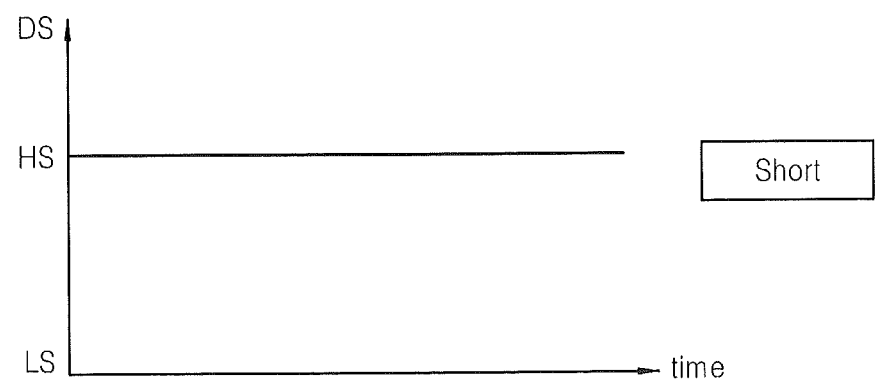

US 9,024,592 B2

AUXILIARY POWER SUPPLY AND USER DEVICE INCLUDING THE AUXILIARY POWER SUPPLY

REFERENCE TO PRIORITY APPLICATION

This application claims the benefit of Korean Patent Application No. 10-2011-0038441, filed Apr. 25, 2011 in the Korean Intellectual Property Office, the disclosure of which is hereby incorporated herein in its entirety by reference.

BACKGROUND

The inventive concept relates to an auxiliary power supply and a user device including the auxiliary power supply. A user device may be or may include a storage device. A user device may be a storage device such as a memory card. Alternatively, a user device may be an electronic device such as a personal computer, a digital camera, a camcorder, or a mobile phone. If a user device is an electronic device, in most cases, the user device may include a storage device for internally storing data.

A user device receives power supplied from an internal or external power supply. However, the user device may be seriously damaged by a sudden power off (SPO) of the power supply. Accordingly, an auxiliary power supply for providing auxiliary power to the user device when an SPO occurs is required.

SUMMARY

Auxiliary power supplies according to some embodiments of the invention include a capacitor (e.g., super capacitor) and a capacitor charging circuit, which is configured to provide a charging current to a first terminal of the capacitor. Enhanced failure detection is provided by a capacitor monitoring circuit, which may be electrically coupled to at least one terminal of the capacitor. The capacitor monitoring circuit is configured to detect when the capacitor is malfunctioning in an open condition as well as when the capacitor is malfunctioning in a short condition.

According to some embodiments of the invention, the capacitor monitoring circuit can include a current monitoring resistor having a first terminal electrically coupled to a second terminal of the capacitor. The capacitor monitoring circuit may further include a comparator having a first input terminal electrically coupled to the first terminal of the resistor and a second input terminal electrically coupled to a second terminal of the resistor. The capacitor monitoring circuit is configured to detect when the capacitor is malfunctioning in an open condition by detecting when a voltage across the first and second input terminals of the comparator has been continuously maintained at or below a first threshold voltage level during a first measurement time interval. Alternatively, the capacitor monitoring circuit is configured to detect when the capacitor is malfunctioning in a short condition by detecting when the voltage across the first and second input terminals of the comparator has been continuously maintained at or above a second threshold voltage level during a second measurement time interval.

According to still further embodiments of the invention, the capacitor monitoring circuit may include a determination circuit, which is electrically coupled to an output of the comparator. This determination circuit is configured to detect when the output of the comparator is being toggled between unequal voltage levels. This determination circuit may also be electrically coupled to the first terminal of the capacitor. In some of these embodiments of the invention, the determination circuit may include a timer and a counter, which is configured to count a number of times the output of the comparator is toggled over a time interval set by the timer. The accumulation of a sufficient count over a preset monitoring time interval will reflect normal operation of the auxiliary power supply and capacitor.

BRIEF DESCRIPTION OF THE DRAWINGS

Exemplary embodiments of the inventive concept will be more clearly understood from the following detailed description taken in conjunction with the accompanying drawings in which:

FIG. 21 illustrates graphs showing a detection signal according to the state of the capacitor illustrated in FIG. 19;

DETAILED DESCRIPTION OF THE EMBODIMENTS

Figure 1:
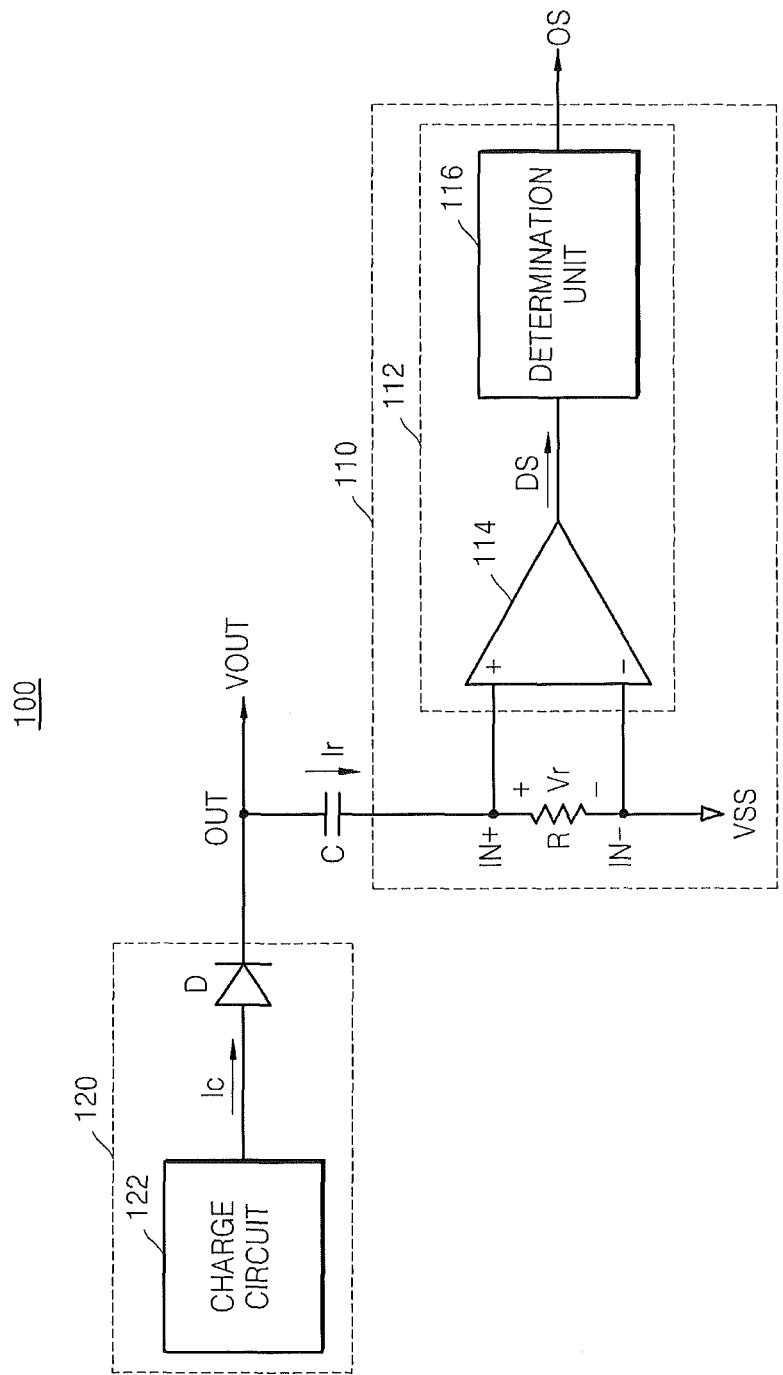
FIG. 1 is a block diagram of an auxiliary power supply according to an embodiment of the inventive concept.

The attached drawings for illustrating exemplary embodiments of the inventive concept are referred to in order to gain a sufficient understanding of the inventive concept, the merits thereof, and the objectives accomplished by the implementation of the inventive concept. Hereinafter, the inventive concept will be described in detail by explaining embodiments of the inventive concept with reference to the attached drawings. Like reference numerals denote like elements in the drawings.

FIG. 1 is a block diagram of an auxiliary power supply 100 according to an embodiment of the inventive concept. Referring to FIG. 1, the auxiliary power supply 100 includes a capacitor C, a monitoring unit 110, a charge circuit unit 120, and an output terminal OUT. The capacitor C is a power storage device capable of storing a high quantity of charge. The amount of charge stored in the capacitor C is referred to as a stored charge amount Q. The capacitor C may be a super capacitor, which is an element having intermediate characteristics between a general capacitor and a battery. A first terminal of the capacitor C is connected to the output terminal OUT and a second terminal of the capacitor C is connected to the monitoring unit 110. Although one capacitor C is illustrated in FIG. 1, the capacitor C may include a plurality of capacitors connected in series or parallel.

The monitoring unit 110 monitors the state of the capacitor C. The state of the capacitor C may be a normal state, an open state, or a short state. If the state of the capacitor C is in a normal state, the capacitor C may store charges and thus may function as an auxiliary power source. If the capacitor C is open or shorted, the capacitor C may not store charge and thus may not function as an auxiliary power source. The capacitor C may be open if an equivalent series resistance (ESR) is increased in response to deterioration of the capacitor C. If the capacitor C is a super capacitor, a general assembling process (e.g., a soldering process) performed at high temperature may not be used due to the chemical characteristics of an electrolyte of the super capacitor. If a high temperature process is performed, then an assembling error may occur in a printed circuit board (PCB) and thus a connection point of the capacitor C may be open. The capacitor C may become shorted if a portion of metal pieces for forming two terminals of the capacitor C falls off due to deterioration of the capacitor C. Otherwise, the capacitor C may be shorted if a conductor (e.g., a metal case) contacts the two terminals of the capacitor C.

The auxiliary power supply 100 illustrated in FIG. 1 may be used in various devices, including storage devices such as solid state drives. The auxiliary power supply 100 may also be used in other storage devices or other user devices. A device may receive power supplied from a power supply disposed inside or outside the device. The power supply may be referred to as a main power supply or an external power supply. When a sudden power off (SPO) event occurs in the main power supply, the device may operate by using the auxiliary power stored in the auxiliary power supply 100. This auxiliary power is supplied via the output terminal OUT, which is connected to the capacitor C. Referring again to FIG. 1, the charge circuit unit 120 is connected to the capacitor C via the output terminal OUT. The charge circuit unit 120 includes a charge circuit 122, which charges the capacitor C. That is, the charge circuit unit 120 receives power supplied from a main power supply (not shown), and supplies charge to the capacitor C by controlling the power supplied from the main power supply. When the charge circuit unit 120 supplies charge, a charge current Ic may be output from the charge circuit 122. The charge circuit unit 120 may further include a diode D. The diode D may be connected between the output terminal OUT and the charge circuit 122. An anode terminal of the diode D may be connected to the charge circuit 122 and a cathode terminal of the diode D may be connected to the output terminal OUT. The diode D prevents charge from being transferred from the capacitor C to the charge circuit unit 120. That is, the diode D blocks the charge current Ic from flowing in a direction opposite to the direction of an arrow of the charge current Ic in FIG. 1.

Figure 2:
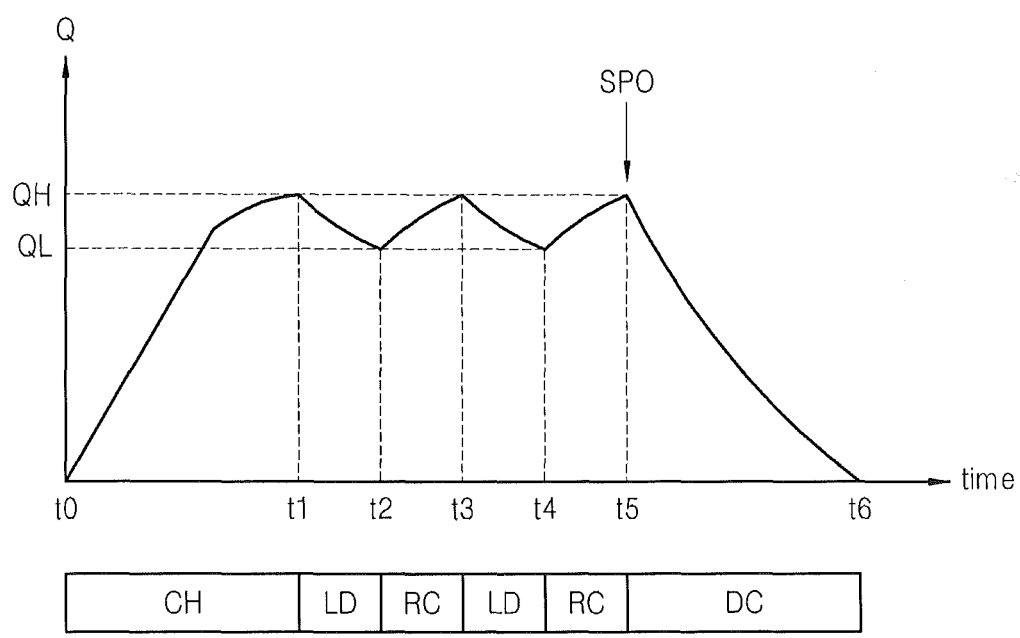
FIG. 2 is a graph showing an example of a charge amount of a capacitor illustrated in FIG. 1 in a normal state.

FIG. 2 is a graph showing how a varying quantity of charge is supported by the capacitor C of FIG. 1 during operation in a normal state. A horizontal axis of the graph represents time and a vertical axis of the graph represents the quantity of charge stored on the capacitor C. During the period between time points t0 and t1, the capacitor C receives charge from the charge circuit unit 120 and stores this charge. For example, at time point t0, a device (not shown) may be powered on. If the stored charge amount Q reaches a first charge amount QH ("high charge"), the charge circuit unit 120 may stop charging the capacitor C by terminating the current Ic supplied thereto. The first charge amount QH may signify the maximum amount of charge that may be stored by the capacitor C. The charge circuit unit 120 may determine the stored charge amount Q based on an output voltage VOUT at the output terminal OUT connected to the capacitor C, and may control whether to supply or block the charge provided to the capacitor C. A period after the device is powered on (the time point t0) until the stored charge amount Q of the capacitor C reaches the first charge amount QH at time point t1 is referred to as a charge period CH.

During the time interval from time t1 to t2, the capacitor C may not receive charge supplied from the charge circuit unit 120 and may discharge somewhat in response to leakage or other type of natural discharge. If the stored charge amount Q is reduced to a second charge amount QL due to leakage discharge, the charge circuit unit 120 will again supply charge to the capacitor C. The second charge amount QL is less than the first charge amount QH. The second charge amount QL may be set according to a capacitance of the capacitor C and the size of auxiliary power to be supplied by the auxiliary power supply 100. During the time interval between time points t2 and t3, the capacitor C may again receive charge from the charge circuit unit 120. If the stored charge amount Q reaches the maximum charge threshold QH during the recharge, the charge circuit unit 120 again terminates providing charge to the capacitor C. A period during which the charge on the capacitor C is reduced because of leakage is referred to as a leakage discharge period LD, and a period during which the charge is again supplied to the capacitor C is referred to as a recharge period RC during the time interval from time points t2 and t3. During the time points t3, t4 and t5, the leakage discharge period LD and the recharge period RC are repeated and thus the capacitor C is repeatedly discharged and recharged.

Finally, during the time interval from time points t5 to t6, the capacitor C is completely discharged. The time point t5 may be a point in time when a sudden power off (SPO) occurs in a main power supply (not shown). If an SPO occurs, the capacitor C may not receive any charge from the charge circuit unit 120 and may therefore provide auxiliary power to the device, while being discharged. The period when the capacitor C provides the auxiliary power after an SPO event beginning at time point t5 is referred to as a discharge period DC. Although the capacitor C is leakage-discharged twice and recharged twice, as shown by FIG. 2, the number of times the capacitor C may be leakage-discharged and recharged is not limited thereto.

Referring again to FIG. 1, the monitoring unit 110 includes a resistor R and a capacitor state determination unit 112. The resistor R is connected to the capacitor C in series, as shown. A first terminal IN+ of the resistor R is connected to the second terminal of the capacitor C and a bias voltage VSS is supplied to a second terminal IN− of the resistor R. The bias voltage VSS may be a ground voltage. The resistor R may have a variable resistance according to the charge current Ic and a variation in the charge current Ic. The resistor R may include a plurality of resistors connected in series and/or in parallel. Because the capacitor C and the resistor R are connected in series, a current Ir flowing from the first terminal IN+ to the second terminal IN− of the resistor R (hereinafter referred to as a resistance current Ir) is the same as a current flowing through the capacitor C. A voltage difference Vr between the first and second terminals IN+ and IN− of the resistor R (hereinafter referred to as a resistance voltage Vr) is proportional to the current Ir.

The capacitor state determination unit 112 is connected to the first and second terminals IN+ and IN− of the resistor R and determines the state of the capacitor C based on the resistance voltage Vr. The capacitor state determination unit 112 includes a comparator 114 and a determination unit 116. The comparator 114, which is connected to the first and second terminals IN+ and IN− of the resistor R, compares the voltages VIN+ and VIN− of the first and second terminals IN+ and IN− of the resistor R, and outputs a detection signal DS. The comparator 114 may be configured as an operational amplifier. If the comparator 114 is an operational amplifier, a circuit for tuning may be added. If a difference between the first and second voltages VIN+ and VIN− is greater than a reference value, the detection signal DS output from the comparator 114 may be driven to a high state HS by the comparator 114. Alternatively, if the difference between the first and second voltages VIN+ and VIN− is equal to or less than the reference value (e.g., 0 volts), the detection signal DS output from the comparator 114 may be driven to a low state LS. If the first and second voltages VIN+ and VIN− are the same, the resistance voltage Vr has a value of 0 Volts, which signifies a resistance current Ir of 0 milliamps. In this case, the detection signal DS is driven to a low state LS. However, if the first and second voltages VIN+ and VIN− are different from each other, the detection signal DS is driven to a high state HS to thereby reflect a positive current Ir.

The determination unit 116 is connected to the comparator 114 and determines the state of the capacitor C based on the detection signal DS. The determination unit 116 may output an output signal OS representing the state of the capacitor C. In order to generate the output signal OS based on the detection signal DS, the determination unit 116 may include an additional circuit. For example, the determination unit 116 may output the output signal OS by using an event driven method. The determination unit 116 may generate an event only when the state of the capacitor C is determined as an error state (an open or short state) based on the detection signal DS, and may not generate an event when the state of the capacitor C is determined as a normal state. For example, the event may be a falling or rising edge of the output signal OS.

A user of the device (not shown) may be aware of the state of the capacitor C based on the output signal OS. If the output signal OS indicates an error state (an open or short state) of the capacitor C, the capacitor C may be replaced. Accordingly, by monitoring the value of the output signal, the reliability of the auxiliary power supply 100 may be improved and a lifetime of the auxiliary power supply 100 may be extended. The determination unit 116 may be realized using a microprocessor, an organic light-emitting diode (OLED), and/or a switching circuit, for example.

Figure 3:
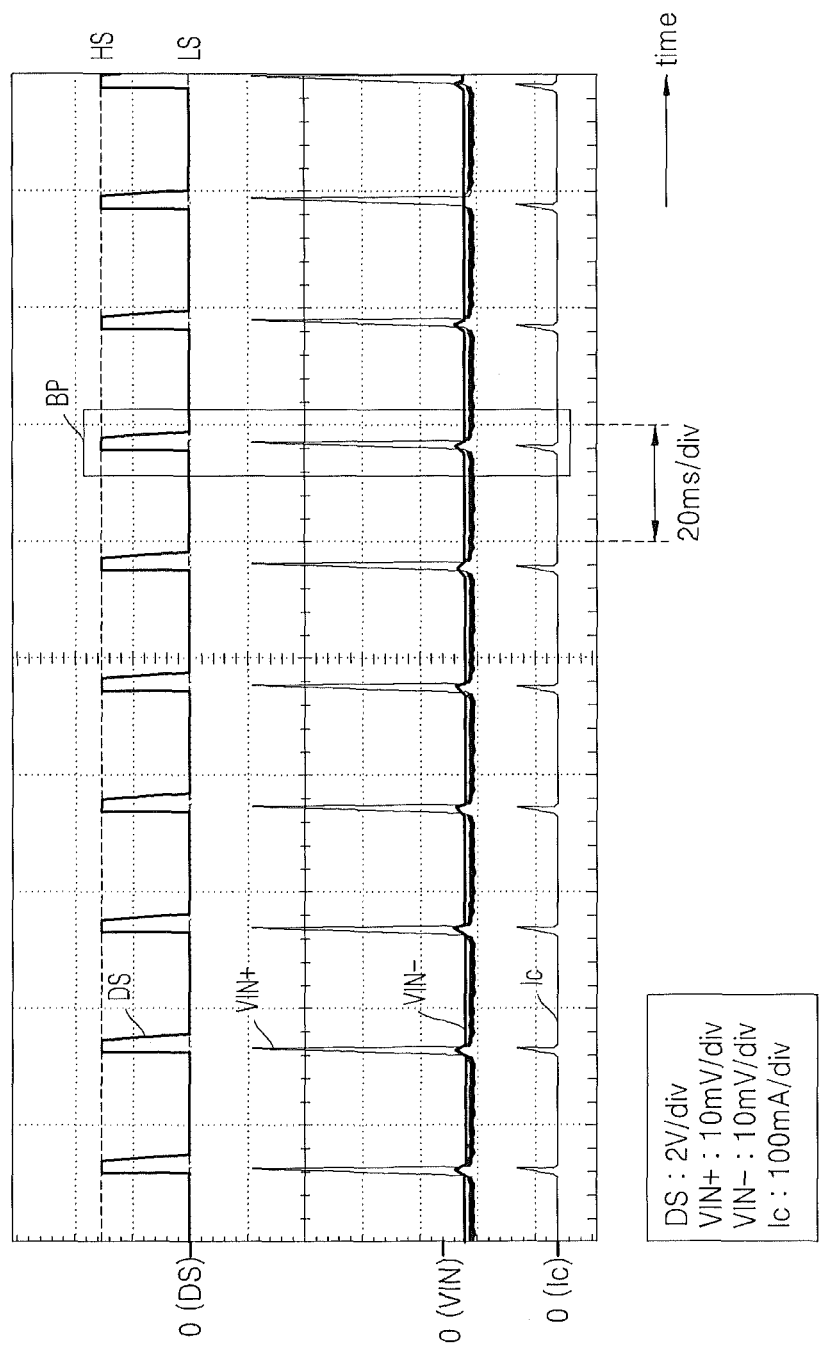
FIGS. 3 through 6 are graphs showing a detection signal, a first voltage, a second voltage, and a charge current according to the state of the capacitor illustrated in FIG. 1.
Figure 4:
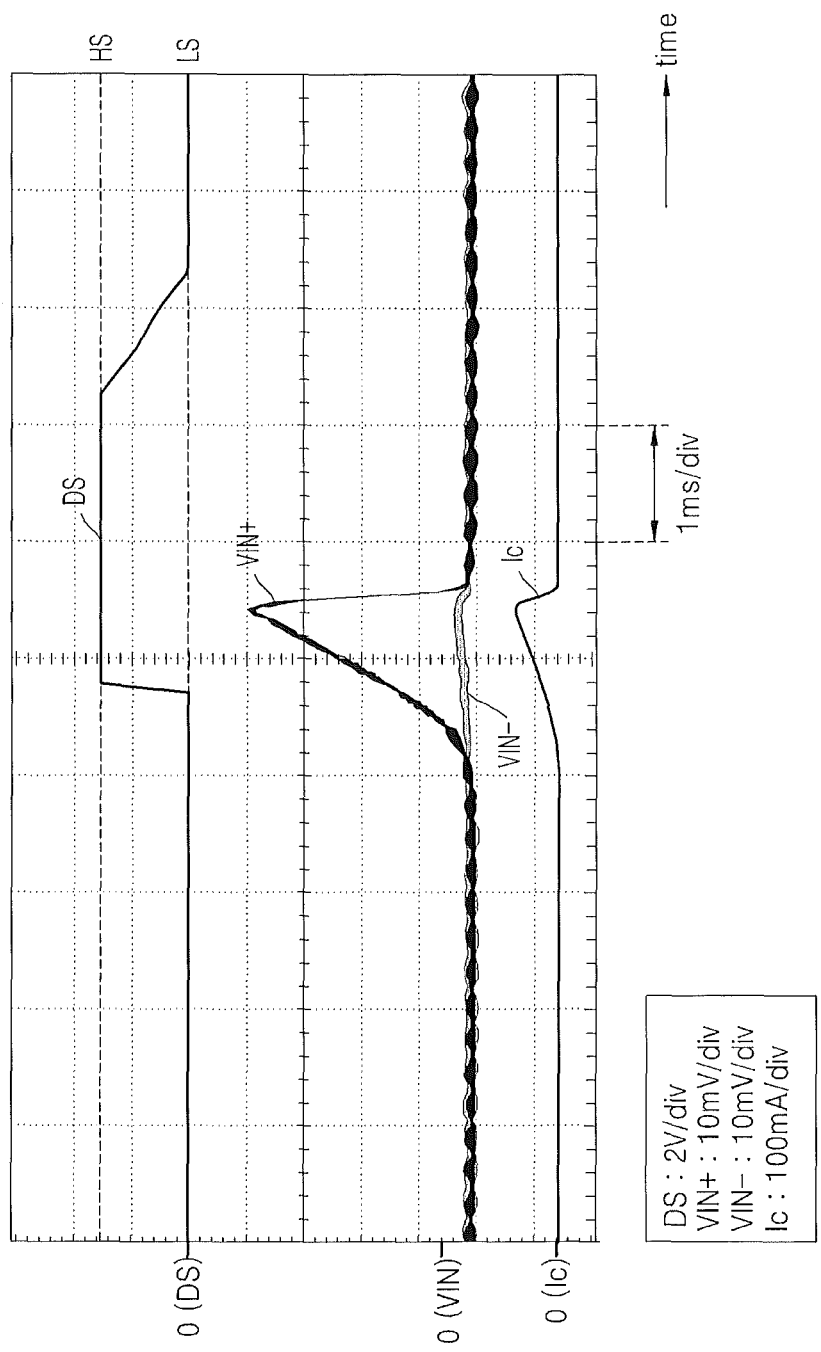
Figure 5:
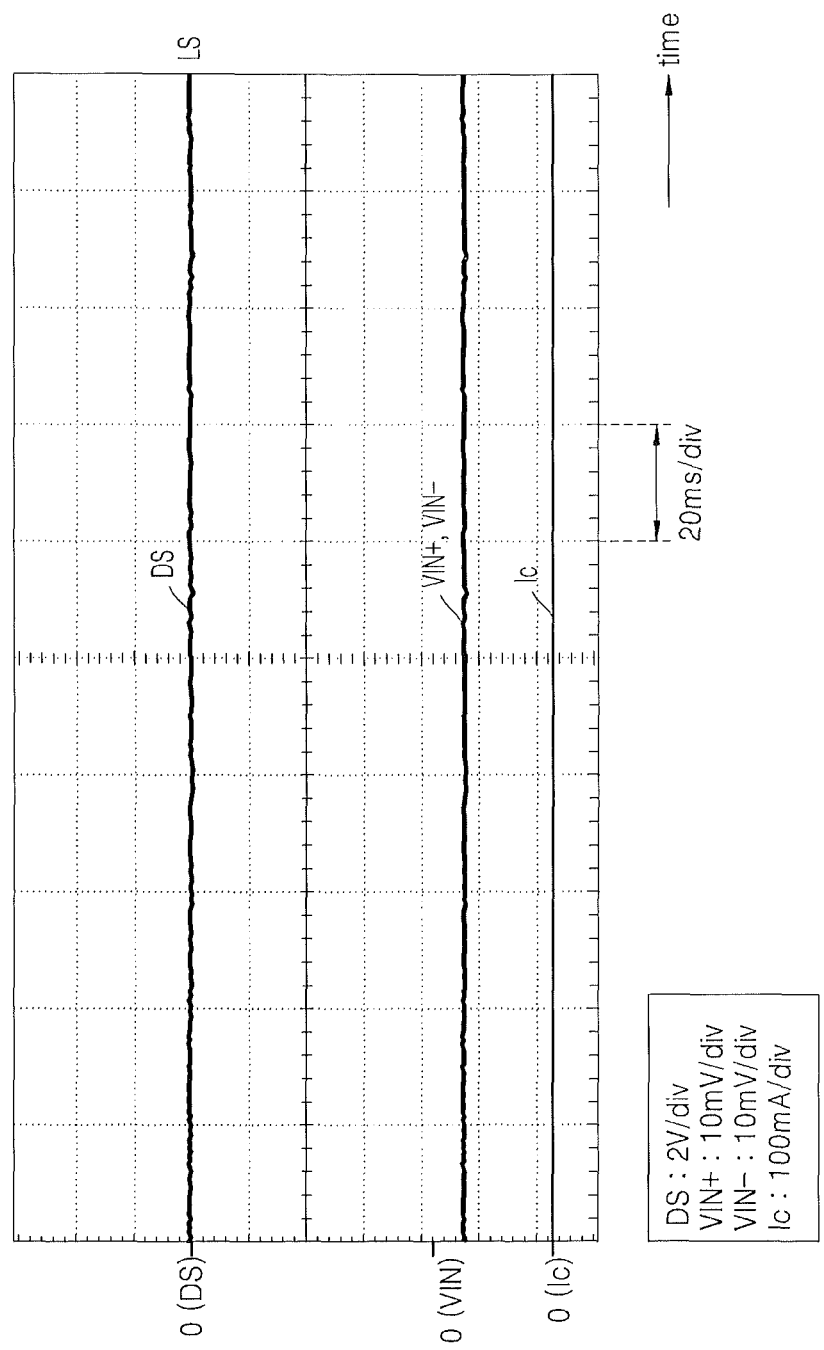
Figure 6:
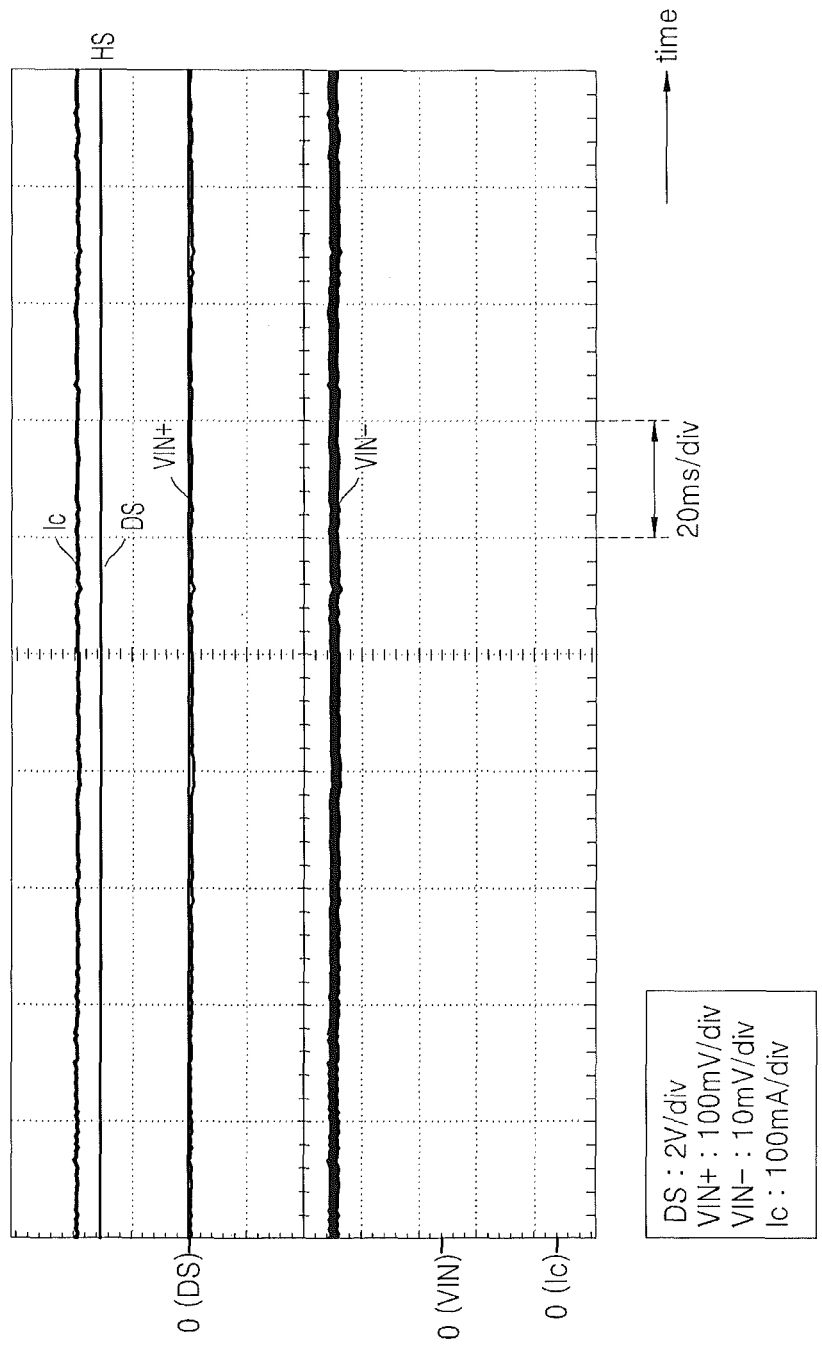

FIGS. 3 through 6 are graphs showing the detection signal DS, the first voltage VIN+, the second voltage VIN−, and the charge current Ic according to the state of the capacitor C illustrated in FIG. 1. FIG. 4 is a magnified view of a highlighted portion BP of FIG. 3. FIGS. 3 through 6 show simulation results when the capacitor C has a capacitance of 10 F, the resistor R has a resistance of 200 milliohms (mΩ), and the comparator 114 is an operational amplifier MP8102, which is manufactured by Monolithic Power Systems. Referring to FIGS. 3 through 6, a horizontal axis represents time and a vertical axis represents the detection signal DS, the first voltage VIN+, the second voltage VIN−, and the charge current Ic. One gradation on the horizontal axis is 20 ms/div in FIGS. 3, 5, and 6 and is 1 ms/div in FIG. 4. One gradation on the vertical axis in FIGS. 3 through 5 is 2 V/div with respect to the detection signal DS, 10 mV/div with respect to the first voltage VIN+, 10 mV/div with respect to the second voltage VIN− and 100 mA/div with respect to the charge current Ic. One gradation on the vertical axis in FIG. 6 is the same as that in FIGS. 3 through 5 except that one gradation is 100 mV/div with respect to the first voltage VIN+. In FIGS. 3 through 6, on the vertical axis, 0(DS) represents a point when the detection signal DS has a value 0, 0(VIN) represents a point when the first and second voltages VIN+ and VIN− have a value 0, and 0(Ic) represents a point when the charge current Ic has a value 0.

The detection signal DS according to the state of the capacitor C will now be described with reference to FIGS. 1 through 6, and more particularly, with reference to FIGS. 3 through 6. FIGS. 3 and 4 show a case when the state of the capacitor C illustrated in FIG. 1 is a normal state. Referring to FIGS. 3 and 4, the charge current Ic is generated discontinuously. This is because, if the capacitor C is in a normal state, the leakage discharge period LD and the recharge period RC are repeated according to time (see FIG. 2). That is, the charge circuit 110 discontinuously supplies charge power and the charge current Ic is generated discontinuously. Because the resistance current Ir flows whenever the charge current Ic is generated, the first and second voltages VIN+ and VIN− are different from each other. Thus, whenever the charge current Ic is generated, the detection signal DS output from the comparator 114 is changed from the low state LS to the high state HS. If the difference between the first and second voltages VIN+ and VIN− is reduced to 0 Volts, the detection signal DS is changed from the high state HS to the low state LS. However, due to response characteristics of the comparator 114, the detection signal DS may be maintained in the high state HS for a predetermined time interval even as a voltage difference between the first and second voltages VIN+ and VIN− disappears. Hereinafter, a changing of the detection signal DS from the low state LS to the high state HS, or from the high state HS to the low state LS is defined as a toggling of the signal.

In a period when the charge current Ic is not generated (i.e., during the leakage discharge period LD), the first and second voltages VIN+ and VIN− may be the same or the second voltage VIN− may be slightly higher than the first voltage VIN+. However, in the period when the charge current Ic is not generated, since the first and second voltages VIN+ and VIN− have only a slight difference, the comparator 114 may be set to output the detection signal DS in the low state LS. The determination unit 116 may determine the state of the capacitor C as a normal state if the detection signal DS is toggled. The determination unit 116 may also determine the state of the capacitor C as a normal state whenever any pulse in the high state HS occurs in the detection signal DS.

FIG. 5 shows a case when the state of the capacitor C illustrated in FIG. 1 is an open state and the charge current Ic is not generated. If the capacitor C is open, the resistance current Ir will not flow and there will be no voltage difference between the first and second voltages VIN+ and VIN−, which means the detection signal DS will be maintained in the low state LS. In response, the determination unit 116 may determine the state of the capacitor C as an open state if the detection signal DS is not toggled and is maintained in the low state LS for an extended period of time.

FIG. 6 shows a case when the state of the capacitor C illustrated in FIG. 1 is in a short state. Referring to FIG. 6, the charge current Ic is continuously generated because if the capacitor C is shorted, then charges will not be accumulated in the capacitor C and the charge circuit unit 120 will continuously supply charge power and the resistance current Ir will be maintained at a high level, which causes the first voltage VIN+ to be maintained at a level greater than the second voltage VIN−. In response, the detection signal DS generated by the amplifier 114 will be maintained continuously in a high state HS and the determination unit 116 may determine the state of the capacitor C as being in a short state based on the continuously high state of the detection signal DS.

Figure 7:
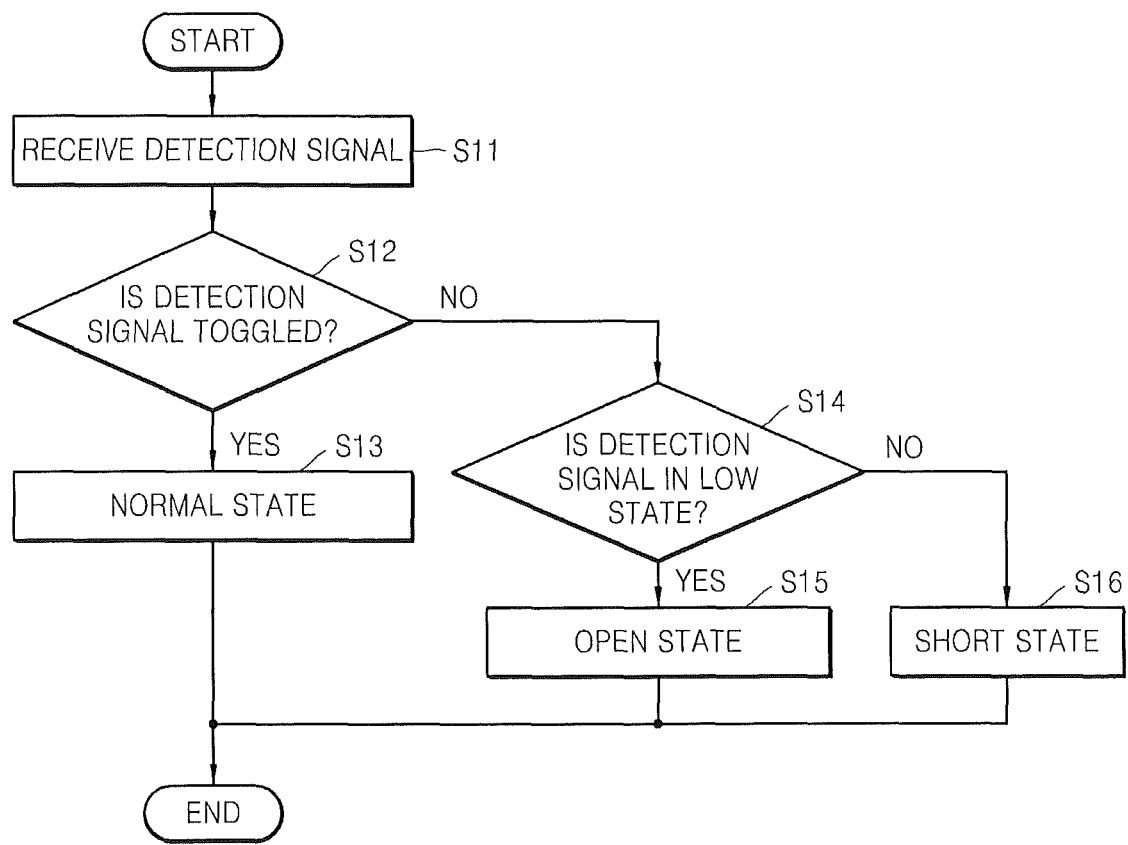
FIG. 7 is a flowchart of a capacitor state determination method of a determination unit illustrated in FIG. 1.

FIG. 7 is a flowchart of a capacitor state determination method performed by the determination unit 116 illustrated in FIG. 1. Referring to FIGS. 1 and 7, the determination unit 116 receives the detection signal DS output from the comparator 114 (S11). The determination unit 116 determines whether the detection signal DS is toggled (S12). If the detection signal DS is toggled, the determination unit 116 determines the state of the capacitor C as being in a normal state (S13). Alternatively, if the detection signal DS is not toggled, the determination unit 116 determines whether the detection signal DS is in the low state LS (S14). If the detection signal DS is maintained in the low state LS, the determination unit 116 determines the state of the capacitor C as being in an open state (S15). But, if the detection signal DS is not in the low state LS (i.e., signal DS is in the high state), the determination unit 116 determines the state of the capacitor C as being in a short state (S16).

The determination unit 116 may determine the state of the capacitor C based on the detection signal DS, but only after the original charge period CH has terminated (i.e., during a time period between the time points t1 and t5).

Table 1 briefly shows the state of the capacitor C according to the detection signal DS.

TABLE 1

| DS | State of the capacitor C |
|---|---|
| Toggle | Normal |
| Low | Open |
| High | Short |

As described herein, the capacitor state determination unit 112 does not need to accurately measure the resistance voltage Vr or the resistance current Ir. Instead, the capacitor state determination unit 112 needs only to determine whether the detection signal DS is toggled or whether the detection signal DS is maintained in a low state LS or a high state HS. Accordingly, the determination unit 112 may be constructed using a relatively simple circuit.

Figure 8:
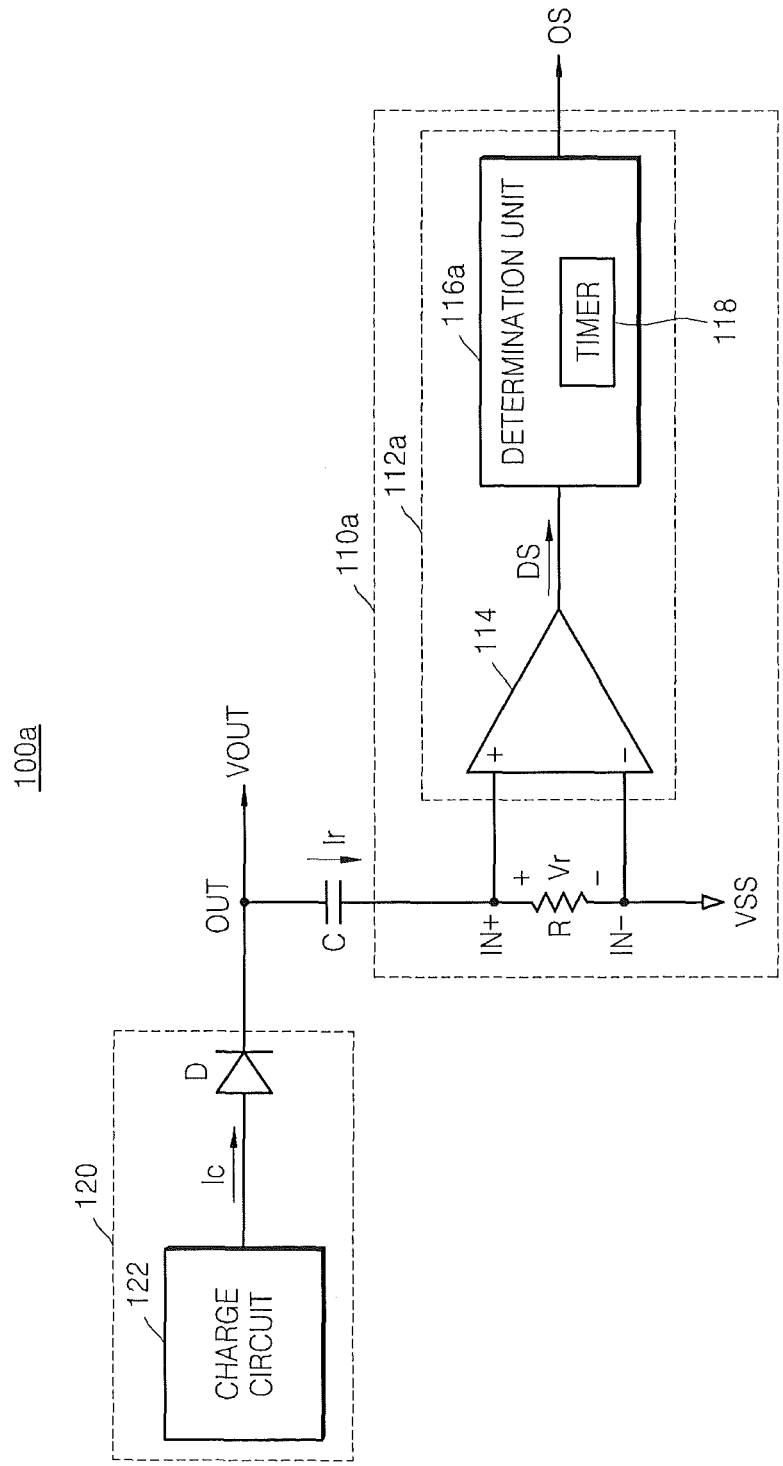
FIG. 8 is a block diagram of an auxiliary power supply according to another embodiment of the inventive concept.
Figure 9:
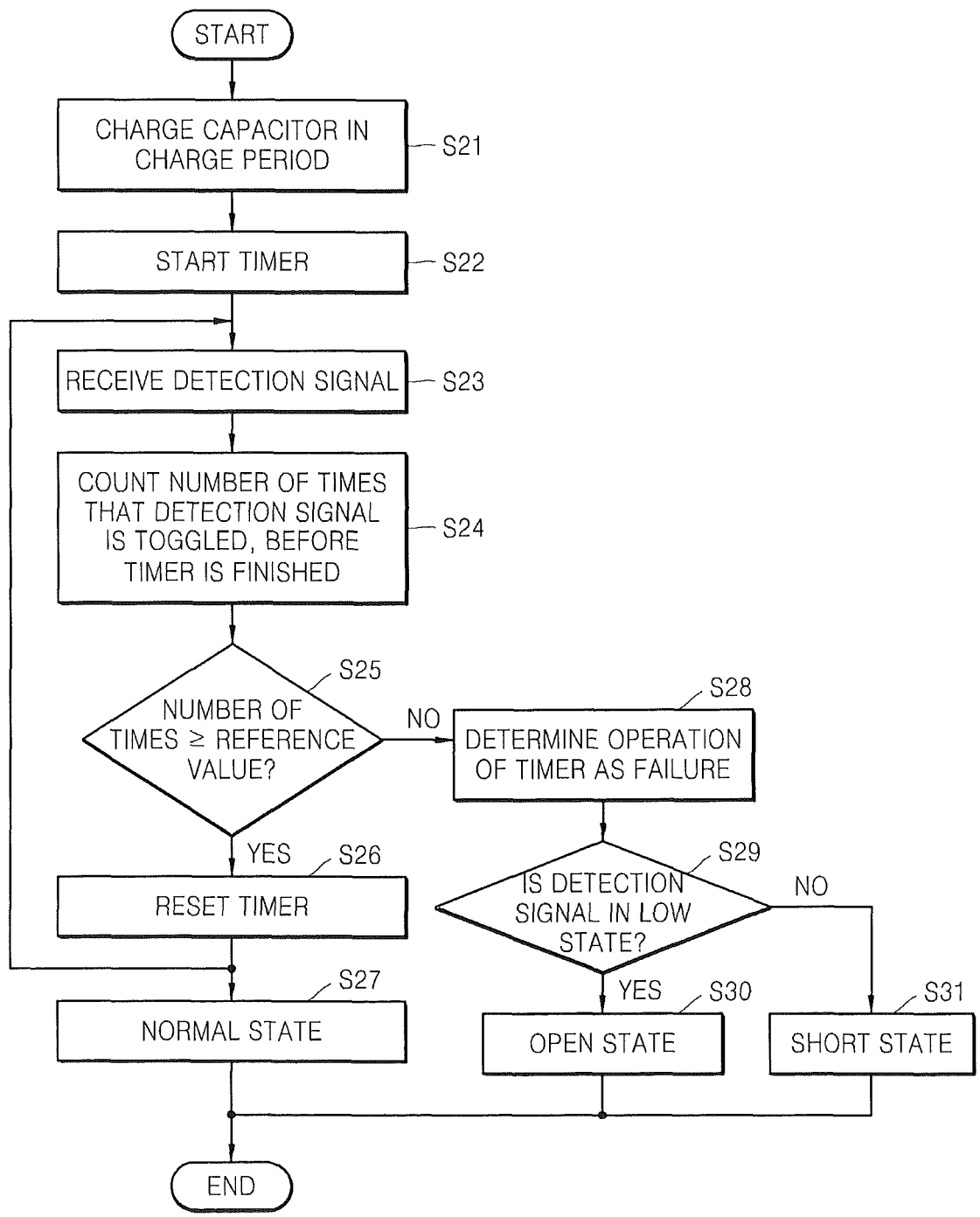
FIG. 9 is a flowchart of a capacitor state determination method of the auxiliary power supply illustrated in FIG. 8.

FIG. 8 is a block diagram of an auxiliary power supply 100a according to another embodiment of the inventive concept. FIG. 9 is a flowchart of operations of a capacitor state determination method of the auxiliary power supply 100a illustrated in FIG. 8. The auxiliary power supply 100a illustrated in FIG. 8 may include the same elements as the auxiliary power supply 100 illustrated in FIG. 1. Like reference numerals denote like elements in FIGS. 1 and 8 and repeated descriptions thereof are not provided here. Referring to FIG. 8, a monitoring unit 110a of the auxiliary power supply 100a includes the resistor R and a capacitor state determination unit 112a. The capacitor state determination unit 112a includes the comparator 114 and a determination unit 116a. The determination unit 116a includes a timer 118. A period for determining the state of the capacitor C may be adjusted using the timer 118.

Referring to FIGS. 8 and 9, in the charge period CH (see FIG. 2), the capacitor C receives charge power supplied from the charge circuit unit 120 and is charged (S21). After the charge period CH, the timer 118 is started (S22). For example, the timer 118 may be started immediately after the charge period CH (e.g., at the time point t1 in FIG. 2), or when the recharge period RC is started for the first time after the charge period CH (e.g., at the point of time t2 in FIG. 2). After the timer 118 is started, the determination unit 116a receives the detection signal DS output from the comparator 114 (S23). The determination unit 116a counts the number TN of times the detection signal DS is toggled, before the timer 118 is finished (S24). Alternatively, the determination unit 116a may count the number of times a pulse in the high state HS occurs in the detection signal DS before the timer 118 is finished. An operation period of the timer 118 (from when the timer 118 is started until when the timer 118 is finished) may be variously set based on an anticipated leakage discharge period and a recharge period. When the timer 118 is finished, the determination unit 116a determines whether the number TN of times the detection signal DS is toggled is equal to or greater than a reference value RV (S25). If the number TN of times the detection signal DS is toggled is equal to or greater than the reference value RV, the timer 118 is reset (S26) and the determination unit 116a determines the state of the capacitor C as being in a normal state (S27). If the timer 118 is reset (S26), the determination unit 116a repeats from operations S23 to S25.

Alternatively, if the number TN of times the detection signal DS is toggled is less than the reference value RV, the operation of the timer 118 is determined as a failure and thus the timer 118 is not reset (S28). If the timer 118 is not reset, the determination unit 116a may determine that the capacitor C has an error. The determination unit 116a also determines whether the detection signal DS is maintained in the low state LS (S29). If the detection signal DS is in the low state LS, the determination unit 116a determines the state of the capacitor C as being in an open state (S30). Otherwise, if the detection signal DS is not in the low state LS, the determination unit 116a determines the state of the capacitor C as being in a short state (S31).

If the timer 118 is used, a period for determining the state of the capacitor C by determining whether toggling is performed may be adjusted and the determination unit 116a may rapidly determine whether the capacitor C has an error by merely determining whether the timer 118 is reset. Although the auxiliary power supply 100 or 100a illustrated in FIG. 1 or FIG. 8 includes one capacitor C, according to another embodiment of the inventive concept, an auxiliary power supply may include a plurality of capacitors.

Figure 10:
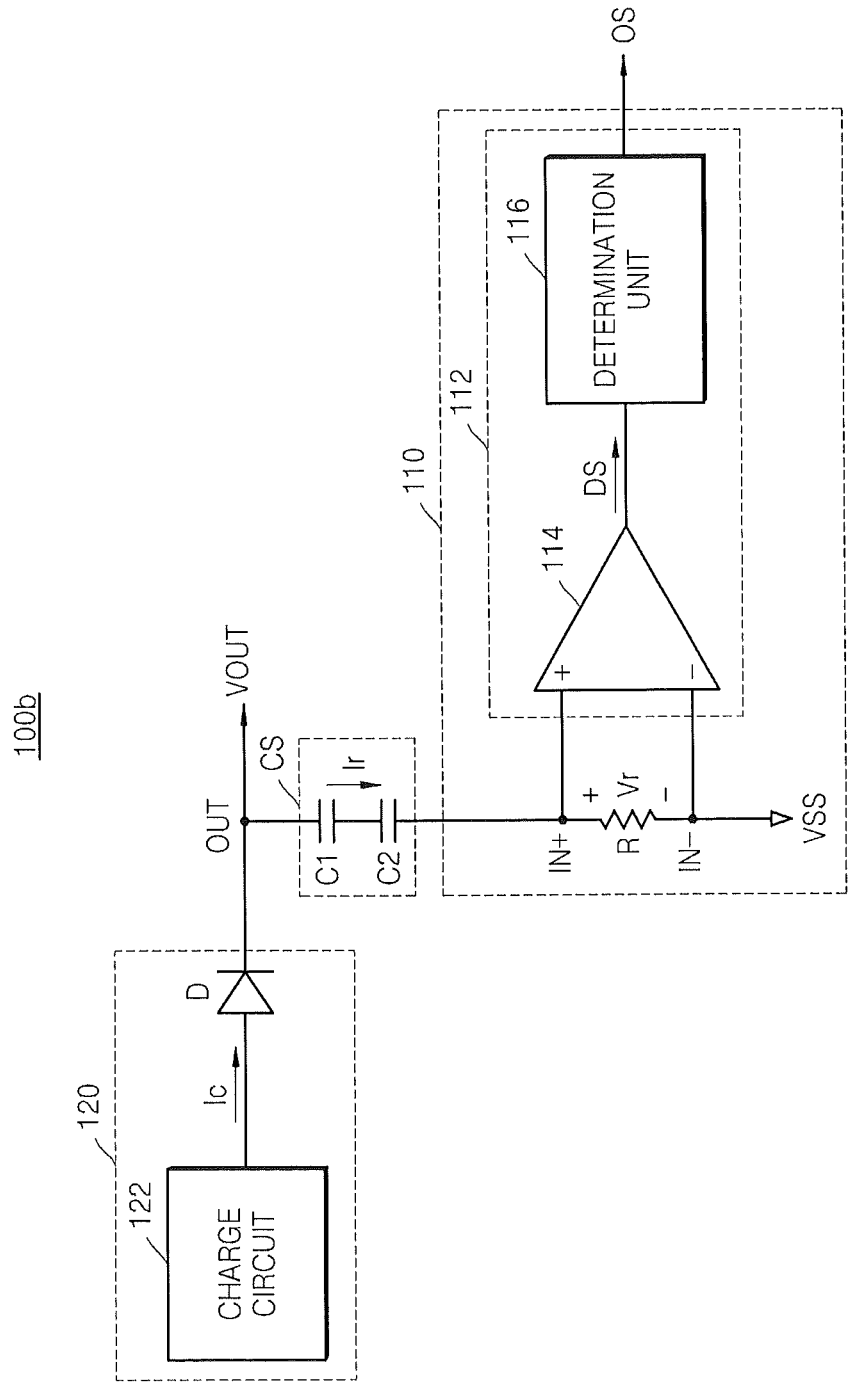
FIG. 10 is a block diagram of an auxiliary power supply according to another embodiment of the inventive concept.

FIG. 10 is a block diagram of an auxiliary power supply 100b according to another embodiment of the inventive concept. The auxiliary power supply 100b illustrated in FIG. 10 may include the same elements as the auxiliary power supply 100 illustrated in FIG. 1. Like reference numerals denote like elements in FIGS. 1 and 10 and repeated descriptions thereof are not provided here. Referring to FIG. 10, a capacitor unit CS is connected between the monitoring unit 110 and the charge circuit unit 120, and includes first and second capacitors C1 and C2 connected in series. The capacitor unit CS may also include three or more capacitors connected in series.

Figure 13:
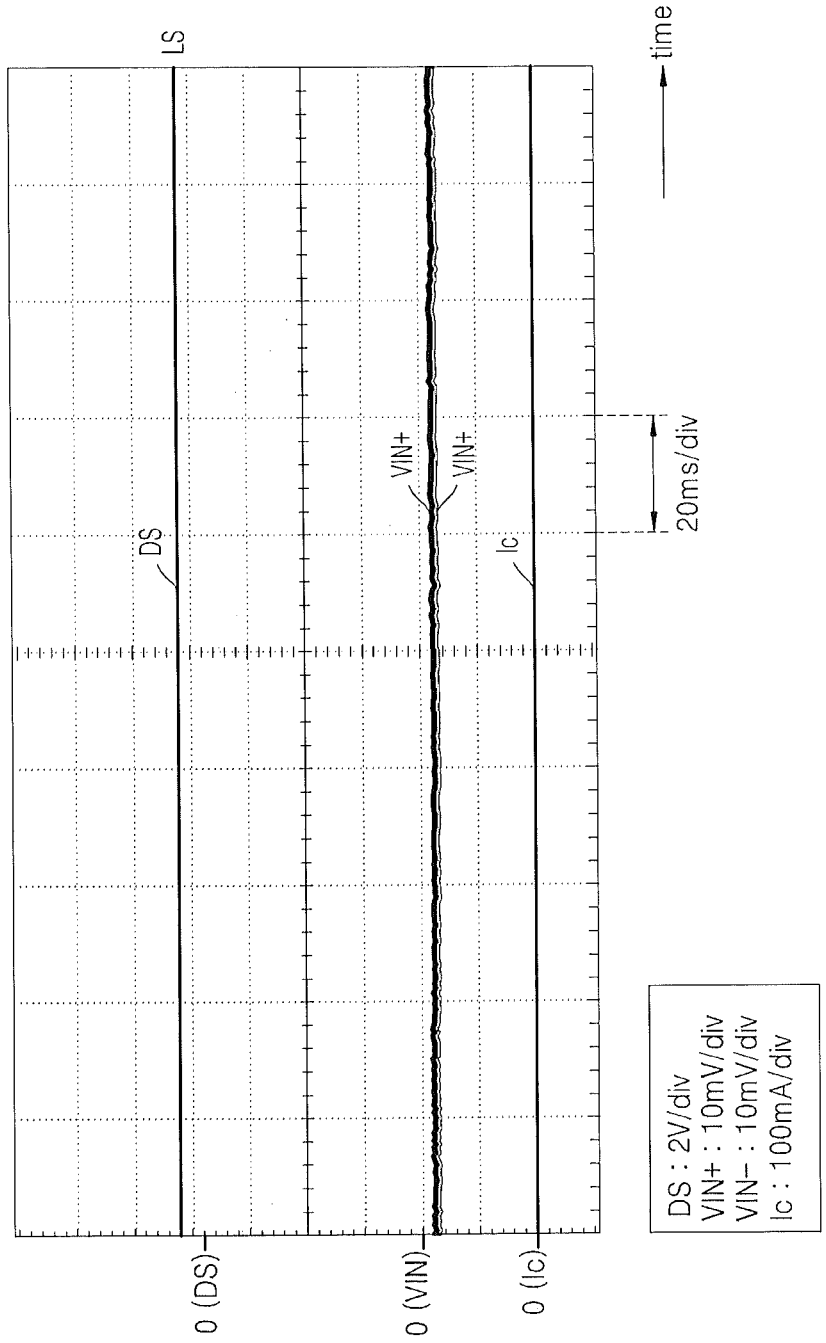
Figure 14:
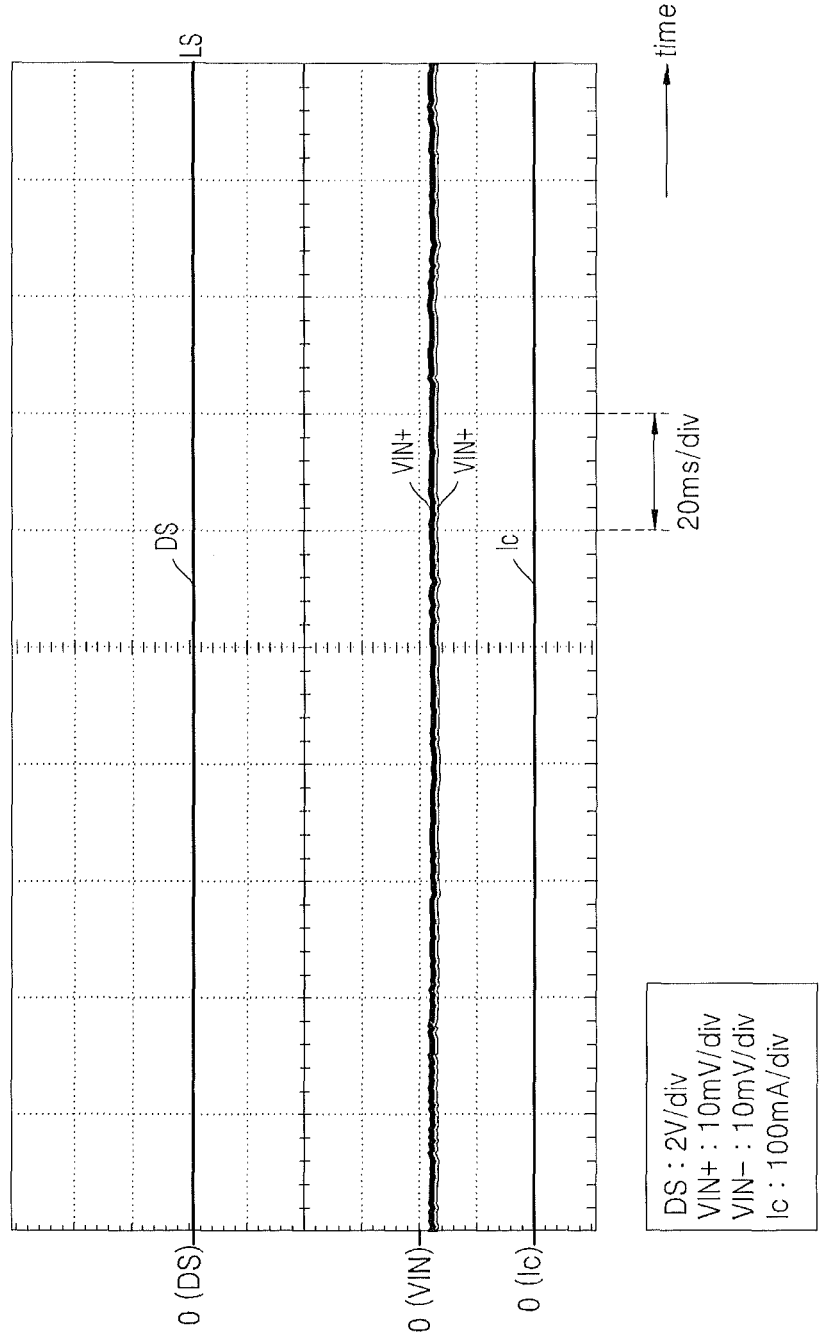
Figure 15:
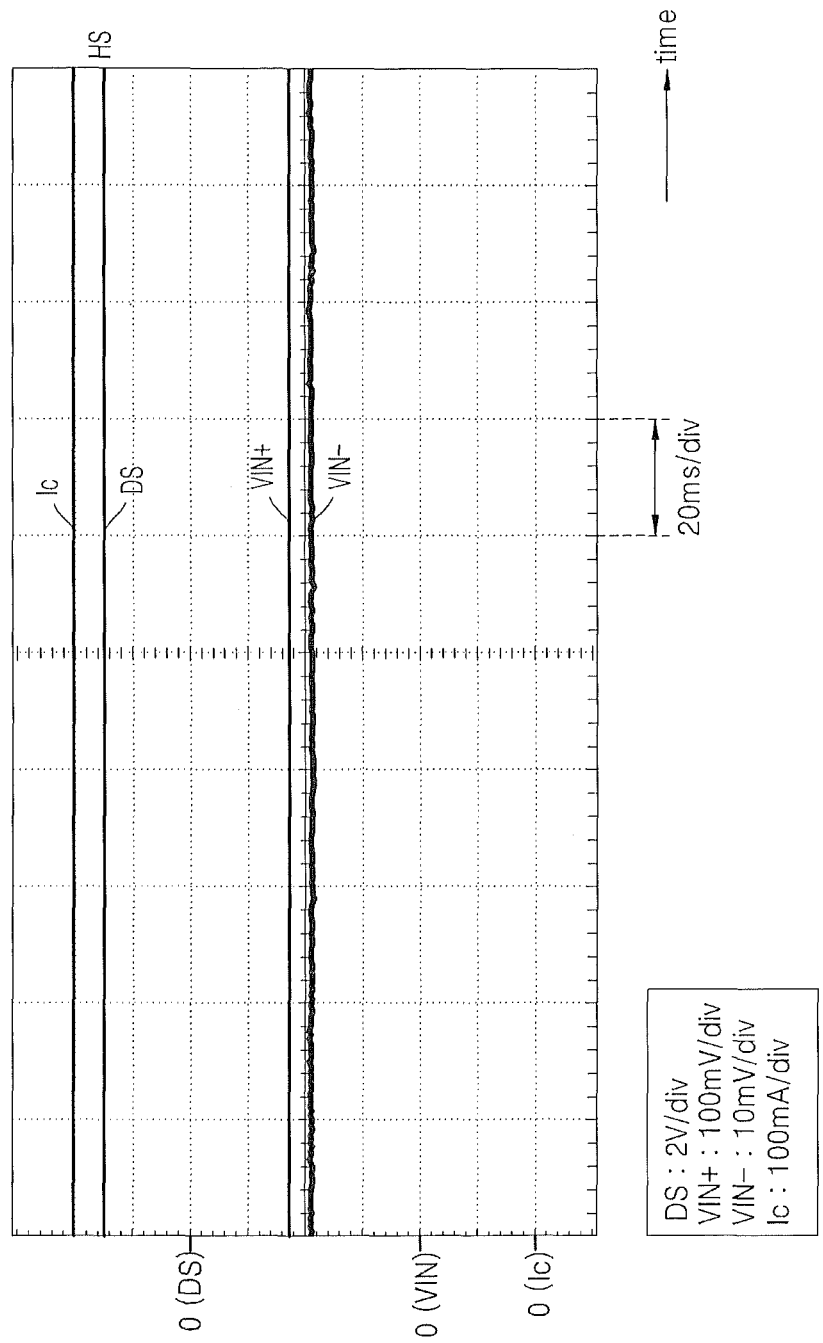
Figure 16:
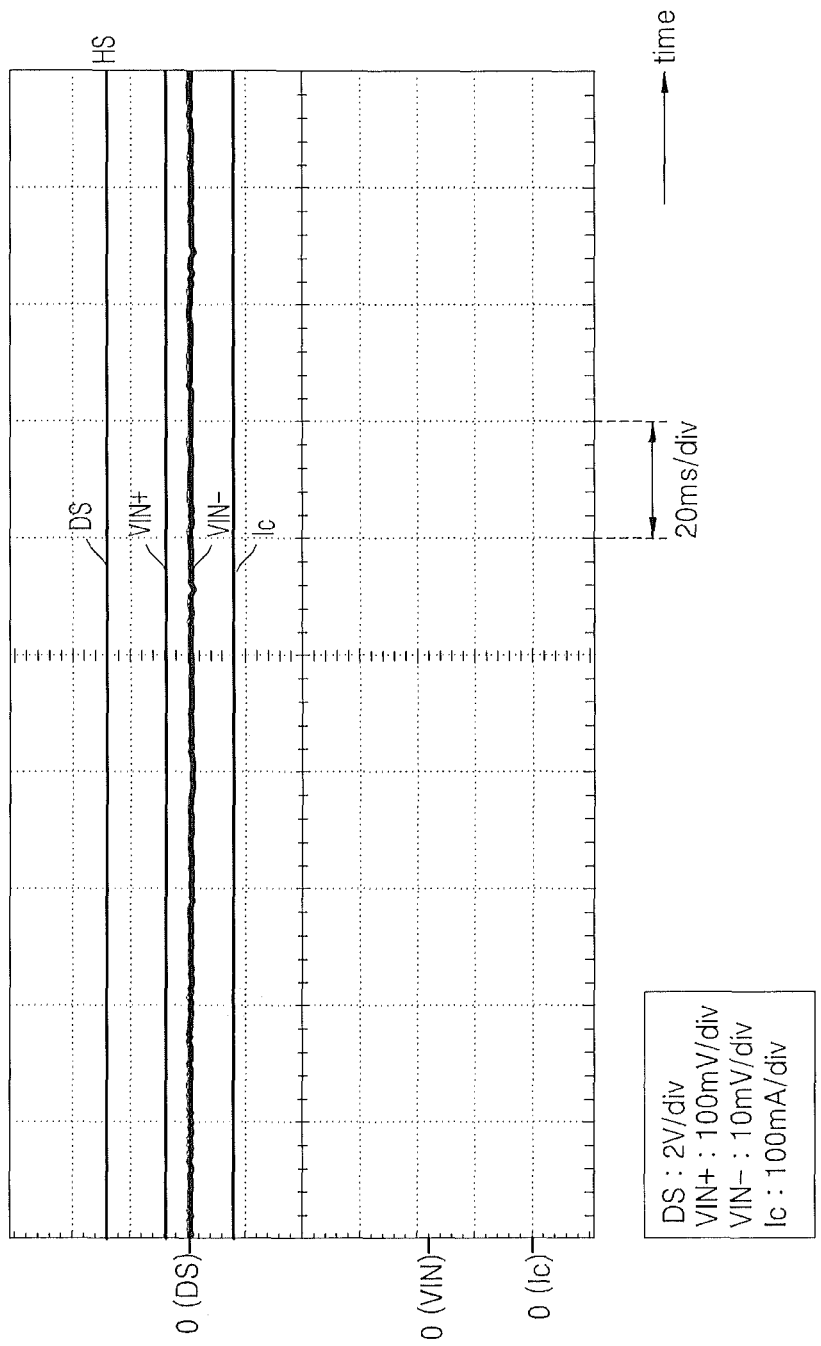
Figure 17:
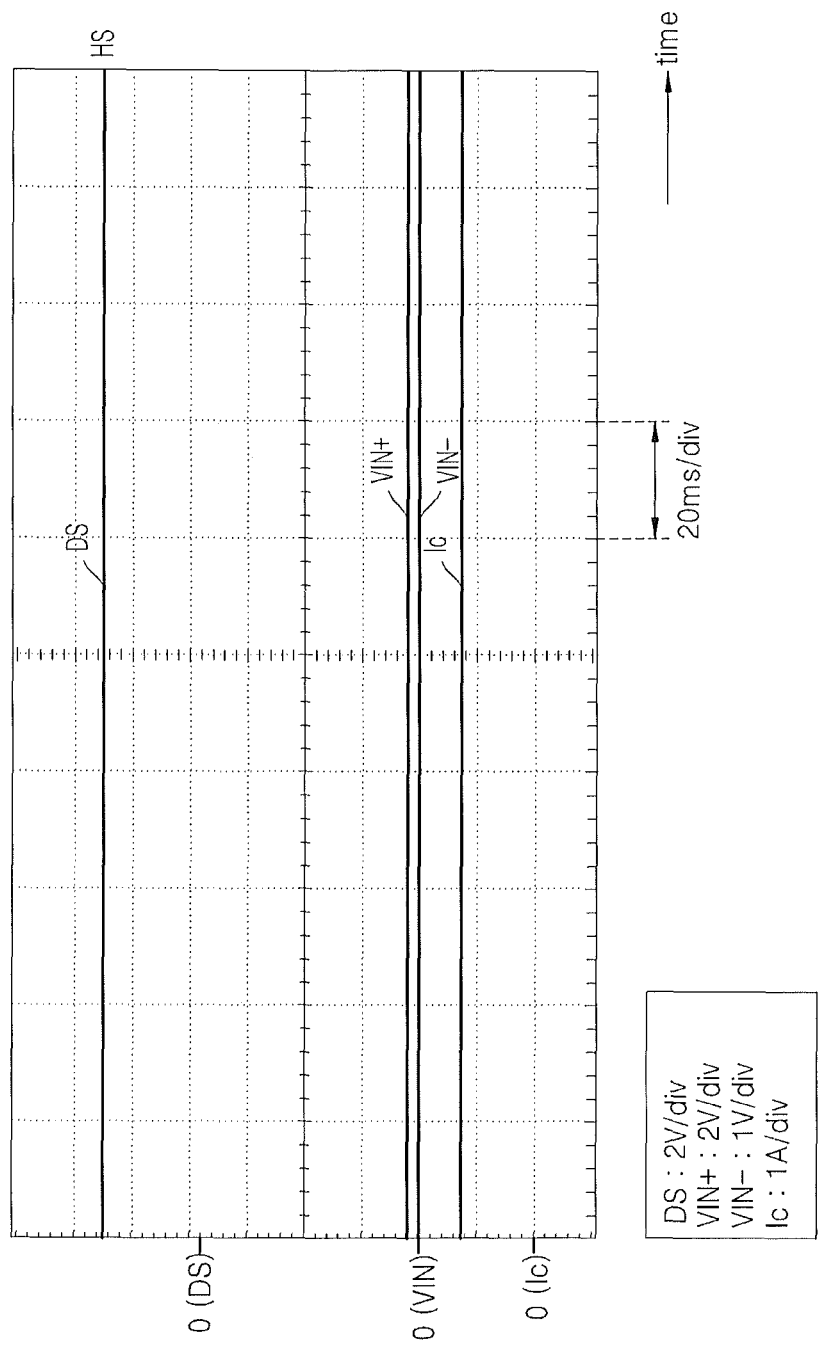

FIGS. 11 through 17 are graphs showing the detection signal DS, the first voltage VIN+, the second voltage VIN−, and the charge current Ic according to the state of the capacitor unit CS illustrated in FIG. 10. FIGS. 11 through 17 show simulation results when the first capacitor C1 has a capacitance of 10 F, the second capacitor C2 has a capacitance of 10 F, the resistor R has a resistance of 200 mΩg, and the comparator 114 is an operational amplifier MP8102. Referring to FIGS. 11 through 17, a horizontal axis represents time and a vertical axis represents the detection signal DS, the first voltage VIN+, the second voltage VIN−, and the charge current Ic. One gradation on the horizontal axis in FIGS. 11 through 17 is 20 ms/div. One gradation on the vertical axis in FIGS. 11 through 14 is 2 V/div with respect to the detection signal DS, 10 mV/div with respect to the first voltage VIN+, 10 mV/div with respect to the second voltage VIN− and 100 mA/div with respect to the charge current Ic. One gradation on the vertical axis in FIGS. 15 and 16 is the same as that in FIGS. 11 through 14 except that one gradation is 100 mV/div with respect to the first voltage VIN+. One gradation on the vertical axis in FIG. 17 is 2 V/div with respect to the detection signal DS and the first voltage VIN+, 1 V/div with respect to the second voltage VIN− and 1 A/div with respect to the charge current Ic.

Figure 11:
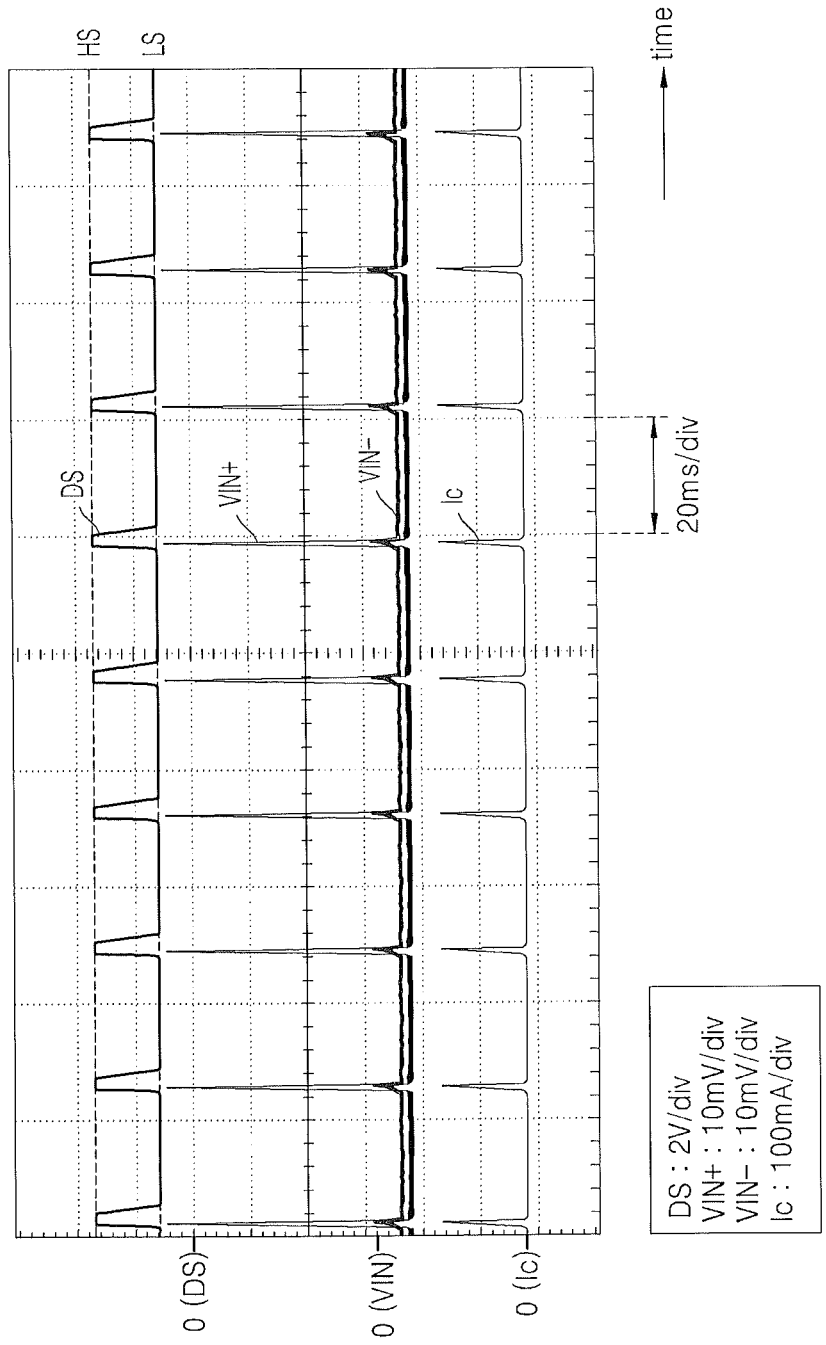
FIGS. 11 through 17 are graphs showing a detection signal, a first voltage, a second voltage, and a charge current according to the state of a capacitor unit illustrated in FIG. 10.

In FIGS. 11 through 17, on the vertical axis, 0(DS) represents a point when the detection signal DS has a value 0, 0(VIN) represents a point when the first and second voltages VIN+ and VIN− have a value 0, and 0(Ic) represents a point when the charge current Ic has a value 0. The detection signal DS according to the state of the capacitor unit CS will now be described with reference to FIGS. 10 through 17, and more particularly, with reference to FIGS. 11 through 17. FIG. 11 shows a case when the state of the first capacitor C1 illustrated in FIG. 10 is in a normal state and the state of the second capacitor C2 illustrated in FIG. 10 is also in a normal state.

Referring to FIG. 11, the charge current Ic is generated discontinuously. This is because if all of the first and second capacitors C1 and C2 included in the capacitor unit CS are in a normal state, the charge circuit 110 discontinuously supplies charge power and the charge current Ic is generated discontinuously. Since the resistance current Ir flows whenever the charge current Ic is generated, the first and second voltages VIN+ and VIN− are different from each other. Thus, whenever the charge current Ic is generated, the detection signal DS output from the comparator 114 is toggled. Accordingly, the determination unit 116 may determine the state of the capacitor unit CS as a normal state if the detection signal DS is toggled. Alternatively, the determination unit 116 may determine the state of the capacitor unit CS as a normal state if a pulse in the high state HS occurs in the detection signal DS.

Figure 12:
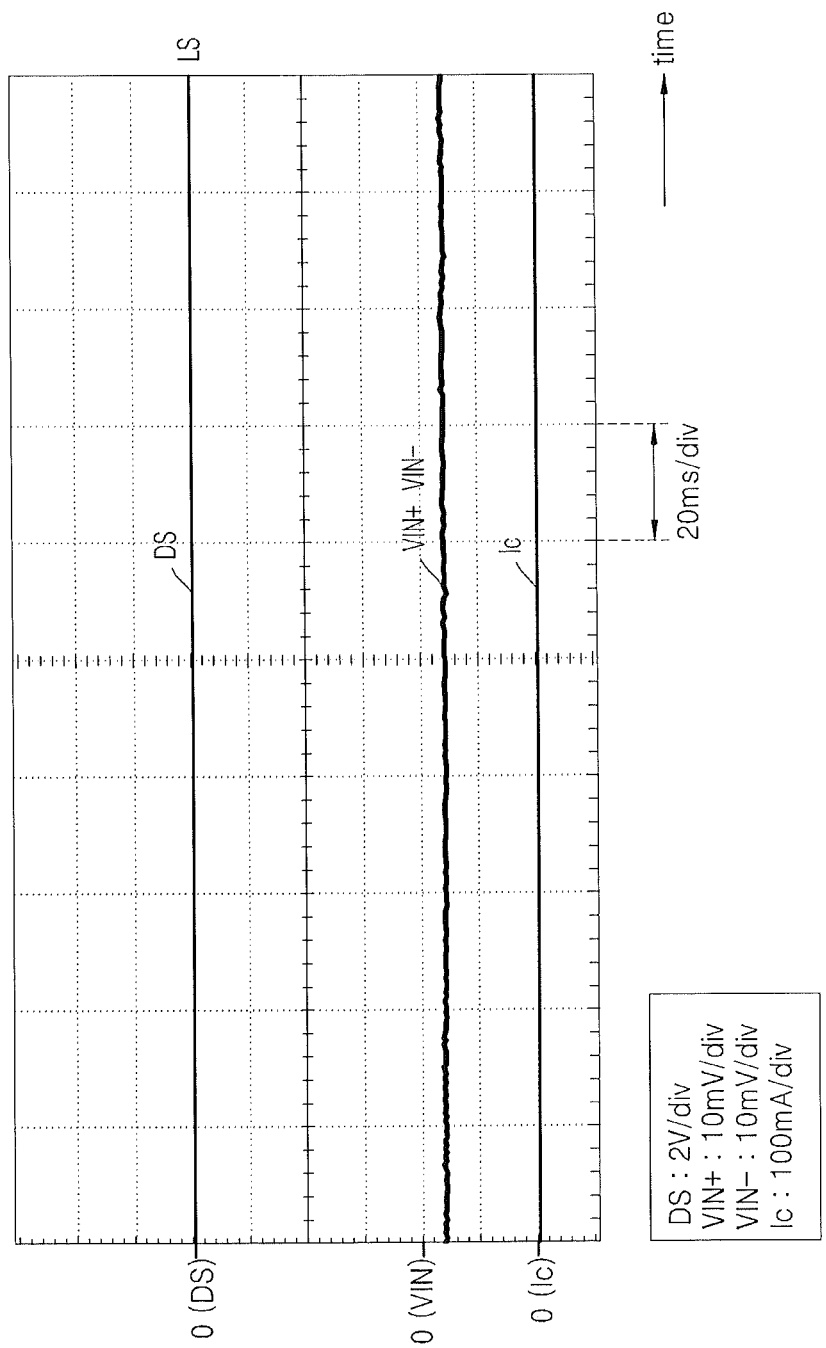

FIG. 12 shows a case when the state of the first capacitor C1 illustrated in FIG. 10 is in an open state and the state of the second capacitor C2 illustrated in FIG. 10 is in a normal state. FIG. 13 shows a case when the state of the first capacitor C1 is in a normal state and the state of the second capacitor C2 is in an open state. FIG. 14 shows a case when the state of the first capacitor C1 is in an open state and the state of the second capacitor C2 is also in an open state. Referring to FIGS. 12 through 14, the charge current Ic is not generated. That is, if at least one of the first and second capacitors C1 and C2 connected in series is open, the charge current Ic constantly has a value 0. Thus, a voltage difference does not exist between the first and second voltages VIN+ and VIN− and the detection signal DS is maintained in the low state LS. In fact, even when the first capacitor C1 is open and the second capacitor C2 is shorted, the charge current Ic also constantly has a value of 0, the detection signal DS is maintained in the low state LS.

If at least one of the first and second capacitors C1 and C2 of the capacitor unit CS is open, the capacitor unit CS may not function as an auxiliary power source. Accordingly, the determination unit 116 may determine that at least one of the first and second capacitors C1 and C2 of the capacitor unit CS is open if the detection signal DS is not toggled and is maintained in the low state LS.

FIG. 15 shows a case when the state of the first capacitor C1 illustrated in FIG. 10 is a short state and the state of the second capacitor C2 illustrated in FIG. 10 is a normal state. FIG. 16 shows a case when the state of the first capacitor C1 is a normal state and the state of the second capacitor C2 is a short state. FIG. 17 shows a case when the state of the first capacitor C1 is a short state and the state of the second capacitor C2 is also a short state. Referring to FIGS. 15 through 17, the charge current Ic is continuously generated. If at least one of the first and second capacitors C1 and C2 of the capacitor unit CS is shorted, an excessive voltage is applied to the other of the first and second capacitors C1 and C2, which is in a normal state. If an excessive voltage is applied to a capacitor, the capacitor will deteriorate quickly and a lifetime of the capacitor will become reduced. Moreover, if the voltage applied to the capacitor is greater than a breakdown voltage, a capacitance of the capacitor unit CS may become reduced and the reliability of providing auxiliary power by the auxiliary power supply 100b will become reduced.

If at least one of the first and second capacitors C1 and C2 connected in series is shorted, a capacitance of the capacitor unit CS is reduced and the charge circuit unit 120 continuously supplies charge power. Thus, the first voltage VIN+ is maintained to be greater than the second voltage VIN− and the detection signal DS is maintained in the high state HS. In FIGS. 15 through 17, although the charge current Ic has different magnitudes, the detection signal DS is constantly maintained in the high state HS. Accordingly, the determination unit 116 may determine that at least one of the first and second capacitors C1 and C2 of the capacitor unit CS is shorted if the detection signal DS is not toggled and is maintained in the high state HS. Table 2 shows the state of the capacitor unit CS according to the detection signal DS.

TABLE 2

| DS | State of the first capacitor C1 | State of the second capacitor C2 |
|---|---|---|
| Toggle | Normal | Normal |
| Low | Open | Normal, short |
| Low | Normal, short | Open |
| Low | Open | Open |
| High | Short | Normal |
| High | Normal | Short |
| High | Short | Short |

Figure 18:
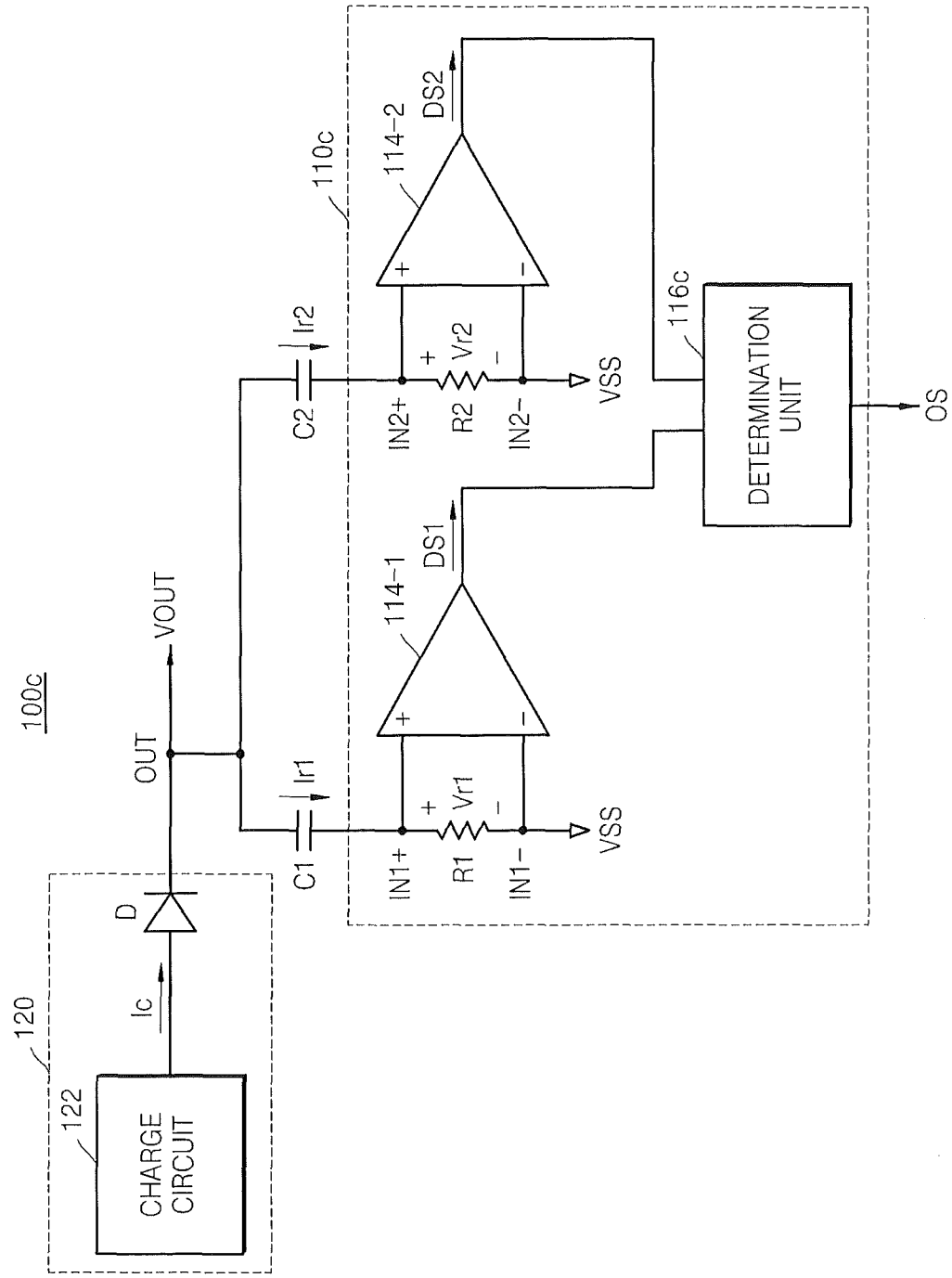
FIG. 18 is a block diagram of an auxiliary power supply according to another embodiment of the inventive concept.

FIG. 18 is a block diagram of an auxiliary power supply 100c according to another embodiment of the inventive concept. The auxiliary power supply 100c illustrated in FIG. 18 may include the same elements as the auxiliary power supply 100 illustrated in FIG. 1. Like reference numerals denote like elements in FIGS. 1 and 18, and repeated descriptions thereof are not provided here. As shown by FIG. 18, between the output terminal OUT and the bias voltage VSS, a first line is shown in which a first capacitor C1 and a first resistor R1 are connected in series and a second line is shown in which a second capacitor C2 and a second resistor R2 are connected in series and are connected in parallel with the first line. A monitoring unit 110c includes a first comparator 114-1, a second comparator 114-2, and a determination unit 116c. The first comparator 114-1 is connected to first and second terminals IN1+ and IN1− of the first resistor R1, compares voltages VIN1+ and VIN1− of the first and second terminals IN1+ and IN1− of the first resistor R1 and outputs a first detection signal DS1. The second comparator 114-2 is connected to first and second terminals IN2+ and IN2− of the second resistor R2, compares voltages VIN2+ and VIN2− of the first and second terminals IN2+ and IN2− of the second resistor R2 and outputs a second detection signal DS2.

The first and second comparators 114-1 and 114-2 may be realized as different operational amplifier elements, or may be realized as a multichannel operational amplifier element formed in one package. If a multichannel operational amplifier element is used, overheads for forming a circuit may be reduced. The determination unit 116c, which is connected to the first and second comparators 114-1 and 114-2, determines the state of the first capacitor C1 based on the first detection signal DS1 and determines the state of the second capacitor C2 based on the second detection signal DS2. The determination unit 116c may output the output signal OS representing the state of the first and second capacitors C1 and C2. Although only two capacitors are illustrated in FIG. 18, the number of capacitors is not limited thereto and three or more capacitors may be connected in parallel. According to the auxiliary power supply 100b or 100c illustrated in FIG. 10 or 18, the state of a plurality of capacitors connected in series and/or in parallel may be efficiently monitored.

Figure 19:
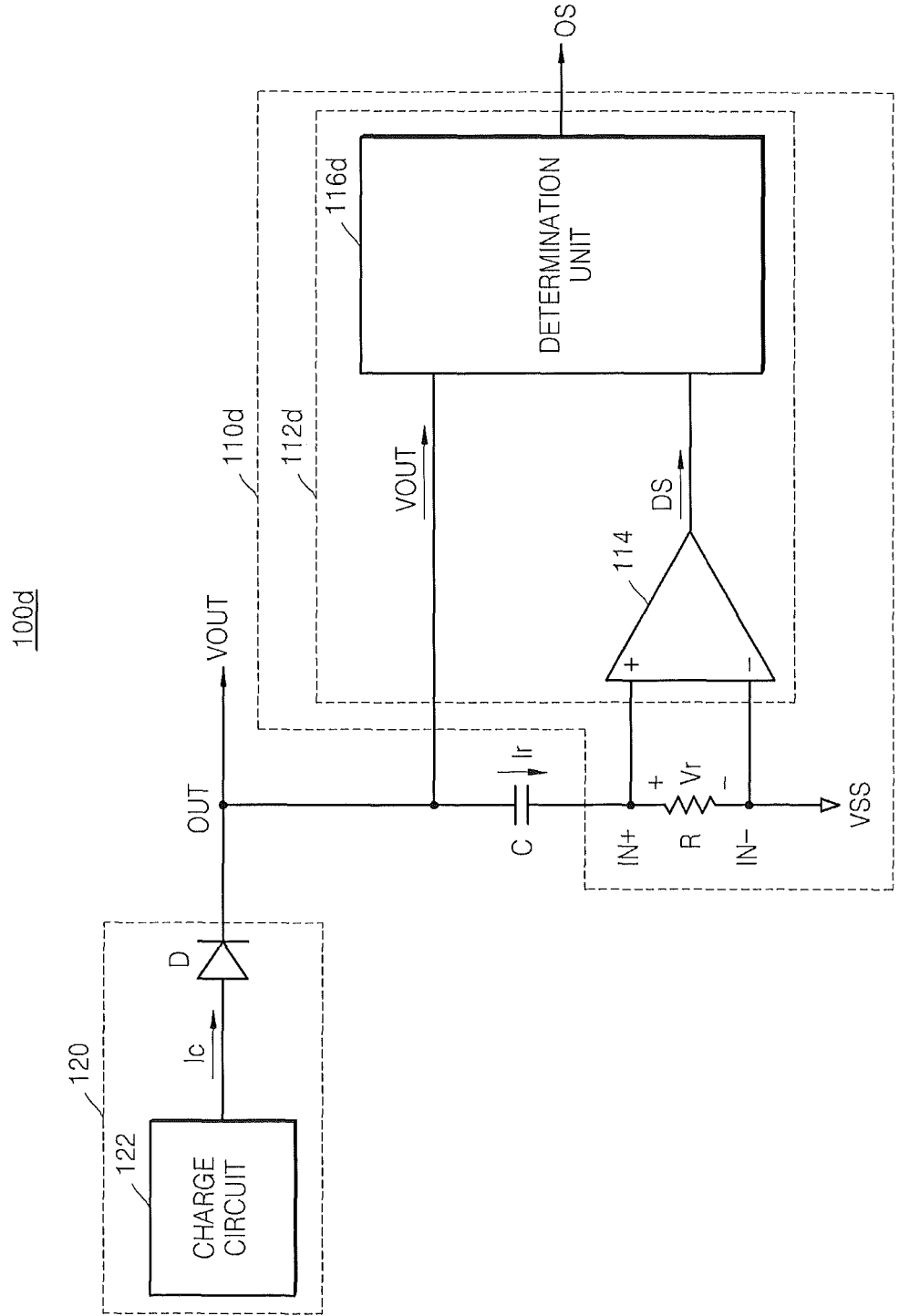
FIG. 19 is a block diagram of an auxiliary power supply according to another embodiment of the inventive concept.

FIG. 19 is a block diagram of an auxiliary power supply 100d according to another embodiment of the inventive concept. The auxiliary power supply 100d illustrated in FIG. 19 may include the same elements as the auxiliary power supply 100 illustrated in FIG. 1. Like reference numerals denote like elements in FIGS. 1 and 19, and repeated descriptions thereof are not provided here. Referring to FIG. 19, a monitoring unit 110d of the auxiliary power supply 100d includes a resistor R and a capacitor state determination unit 112d. The capacitor state determination unit 112d includes the comparator 114 and a determination unit 116d. The determination unit 116d is connected to the comparator 114 and the output terminal OUT. The determination unit 116d receives the detection signal DS from the comparator 114 and receives the output voltage VOUT from the output terminal OUT. The determination unit 116d may output the output signal OS representing the state of the capacitor C.

Figure 20:
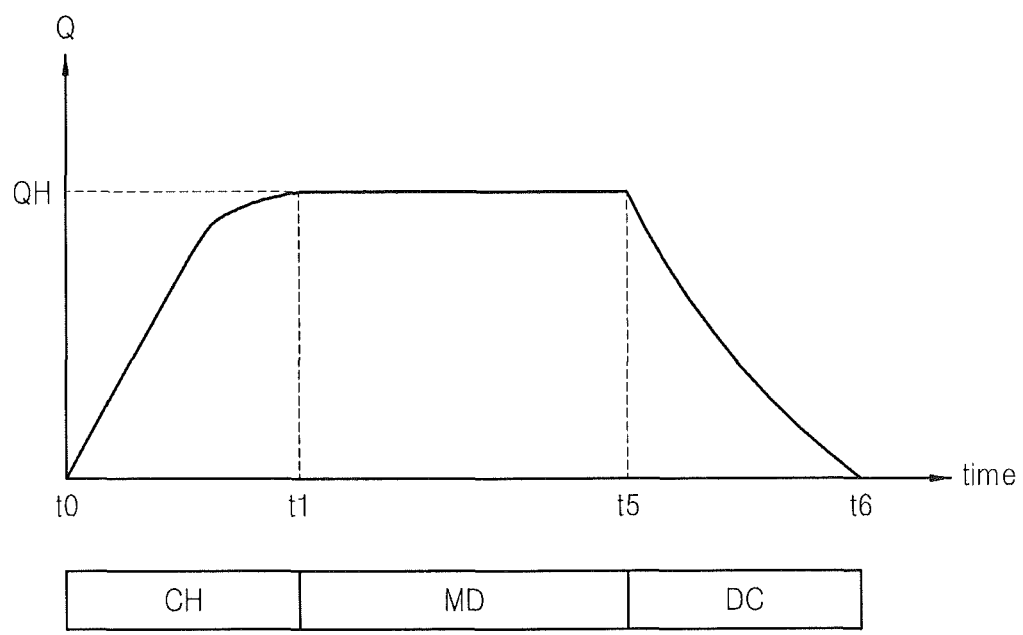
FIG. 20 is a graph showing an example of a charge amount of a capacitor illustrated in FIG. 19 in a normal state.

FIG. 20 is a graph showing an example of a charge amount of the capacitor C illustrated in FIG. 19 in a normal state. Referring to FIG. 20, a horizontal axis represents time and a vertical axis represents the charge amount of the capacitor C (i.e., a stored charge amount Q). Referring to FIGS. 19 and 20, the capacitor C receives charge supplied from the charge circuit unit 120 and is charged in the charge period CH (between the points of time t0 and t1), and provides auxiliary power while being discharged in the discharge period DC (between the points of time t3 and t5).

Unlike FIG. 2, in FIG. 20, in a period after the charge period CH before the discharge period DC (between the points of time t1 and t5), the stored charge amount Q is maintained as the first charge amount QH. This is because the charge circuit unit 120 continuously supplies the charge power. In this case, in order to compensate for leakage current that is discharge from the capacitor C, the charge circuit unit 120 continuously supplies charge and the charge current Ic is continuously generated. A period when the charge circuit unit 120 continuously supplies the charge power is referred to herein as a maintenance period MD.

FIG. 21 illustrates graphs showing the detection signal DS according to the state of the capacitor C illustrated in FIG. 19. Referring to FIG. 21, a horizontal axis represents time and a vertical axis represents the detection signal DS. If the state of the capacitor C is a normal state, then the charge circuit unit 120 will continuously supply the charge current Ic and the detection signal DS will be maintained in the high state HS. However, if the state of the capacitor C is an open state, the charge current Ic will not flow and the detection signal DS will be maintained in the low state LS.

If the capacitor C is shorted, since the charge circuit unit 120 continuously supplies the charge current Ic, the detection signal DS is maintained in the high state HS. When the charge power is continuously supplied, if the state of the capacitor C is a normal state or a short state, the detection signal DS is in the high state HS. Accordingly, whether the capacitor C is normal or shorted is not determined by using only the detection signal DS. Nonetheless, the determination unit 116d may determine whether the capacitor C is normal or shorted based on the output voltage VOUT, For example, the determination unit 116d may determine the state of the capacitor C as a normal state if the output voltage VOUT has a value equal to or greater than a reference value, and may determine the state of the capacitor C as a short state if the output voltage VOUT has a value less than the reference value. Also, the determination unit 116d may determine the state of the capacitor C as a normal or short state by using an event driven method. For example, the determination unit 116d may determine the state of the capacitor C as a normal state if the output voltage VOUT is equal to or rises above the reference value, and may determine the state of the capacitor C as a short state if the output voltage VOUT falls below the reference value.

In order to determine the state of the capacitor C, the determination unit 116d may include an additional circuit such as a comparator. The reference value may be variously set based on a resistance of the resistor R, a capacitance of the capacitor C, or the like. Thus, if the detection signal DS is in the low state LS, the determination unit 116d determines the state of the capacitor C as an open state. If the detection signal DS is in the high state HS, the detection signal DS determines whether the state of the capacitor C is a normal state or a short state, based on the output voltage VOUT. The determination unit 116d may determine the state of the capacitor C after the charge period CH, but before the discharge period DC (a period between the points of time t1 and t5 as shown in FIG. 20). If the charge power is continuously supplied, the determination unit 116d may determine the state of the capacitor C based on the detection signal DS and the output voltage VOUT and may generate the output signal OS having a value that represents a normal, open or short state of the capacitor C.

In order to generate the output signal OS, the determination unit 116d may further include an additional circuit. Even when the charge power is continuously supplied as illustrated in FIG. 20, a timer may be used. In an operation period of the timer (after the timer is started before the timer is finished), if the detection signal DS is in the low state LS, the state of the capacitor C may be determined as an open state. In the operation period of the timer, if the detection signal DS is in the high state HS, the state of the capacitor C may be determined as a normal state or a short state based on the output voltage VOUT. The timer may be started from the charge period CH. For example, the timer may be started from the point of time t0 when the charge period CH is started (see FIG. 20). When the timer is finished, if the state of the capacitor C is determined as a normal state, the timer may be restarted. As such, even in the event the charge circuit unit 120 continuously supplies the charge power as well as a case when the charge circuit unit 120 discontinuously supplies the charge power, the auxiliary power supply 100d may efficiently monitor the state of the capacitor C.

Figure 22:
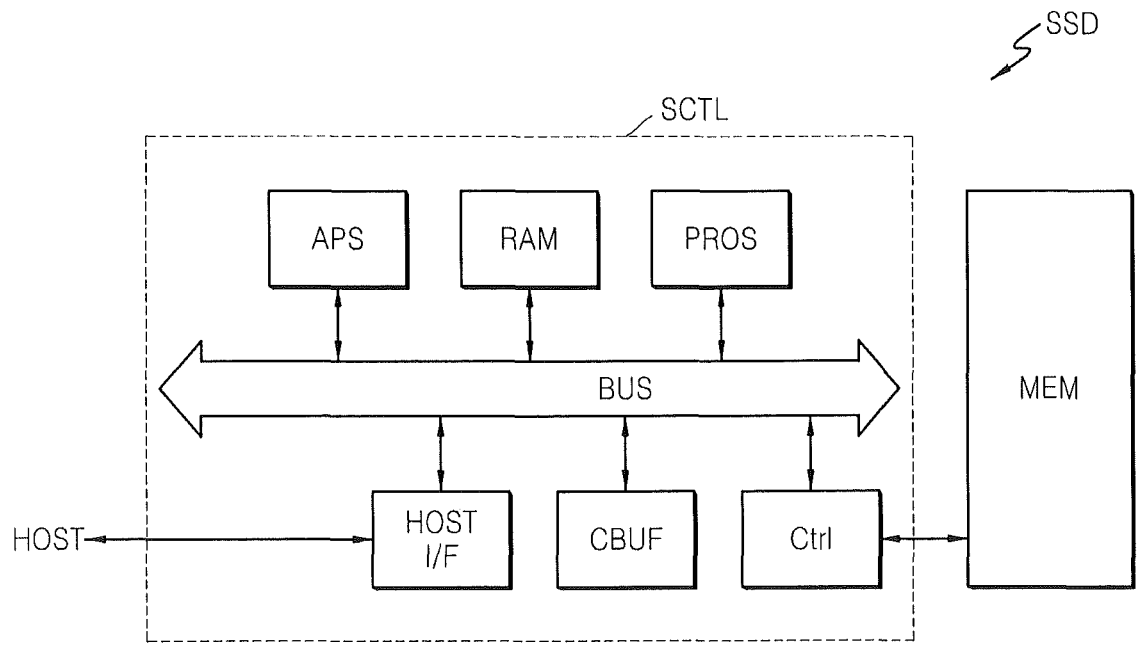
FIG. 22 is a block diagram of a solid state drive according to an embodiment of the inventive concept.

FIG. 22 is a block diagram of a solid state drive SSD according to an embodiment of the inventive concept. Referring to FIG. 22, the solid state drive SSD may include an SSD controller SCTL and a flash memory MEM. The SSD controller SCTL may include an auxiliary power supply APS, a processor PROS, random access memory RAM, a cache buffer CBUF, and a memory controller Ctrl, which are connected to a bus BUS.

When an SPO occurs in a main power supply (not shown), the solid state drive SSD may operate by using auxiliary power stored in the auxiliary power supply APS. The processor PROS controls the memory controller Ctrl to transmit and receive data to and from the flash memory MEM in response to a request (a command, an address, or data) of a host (not shown). The processor PROS and the memory controller Ctrl of the solid state drive SSD may be realized as one advanced RISC machine (ARM) processor. Data required to operate the processor PROS may be loaded to the random access memory RAM.

A host interface HOST I/F receives and transmits the request of the host to the processor PROS, or receives and transmits data between the flash memory MEM and the host. The host interface HOST I/F may interface with the host by using various interface protocols such as universal serial bus (USB), man machine communication (MMC), peripheral component interconnect-express (PCI-E), serial advanced technology attachment (SATA), parallel advanced technology attachment (PATA), small computer system interface (SCSI), enhanced small device interface (ESDI), and intelligent drive electronics (IDE). Data to be transmitted to the flash memory MEM, or transmitted from the flash memory MEM may be temporarily stored in the cache buffer CBUF. The cache buffer CBUF may be, for example, static random-access memory (SRAM).

Figure 23:
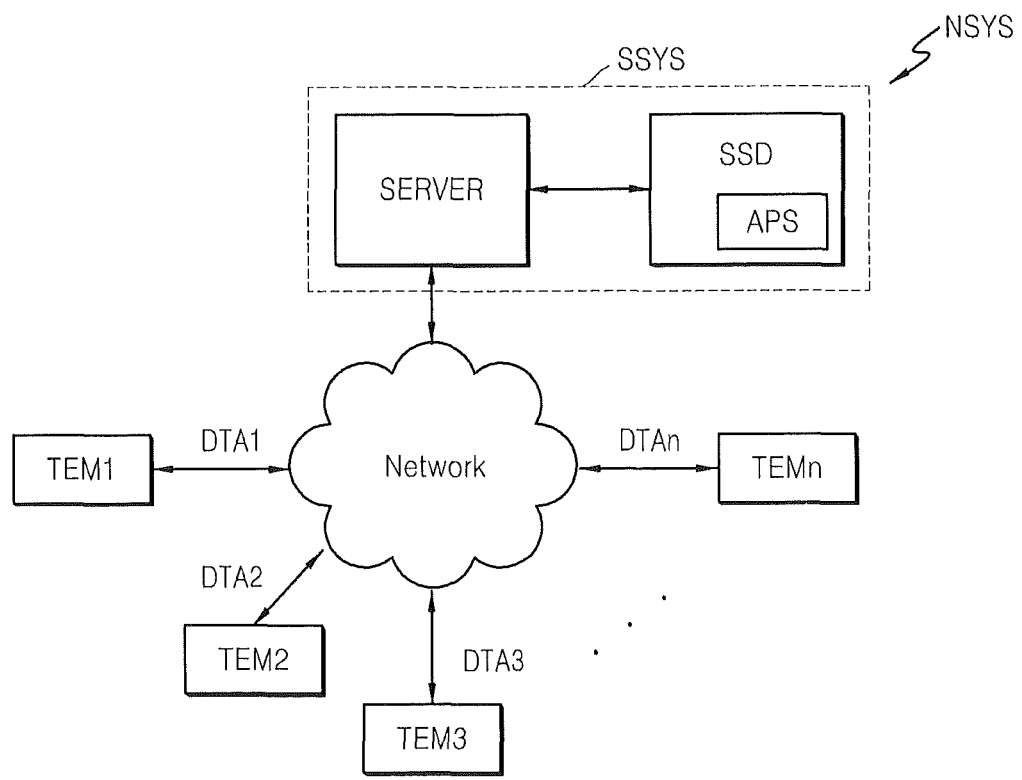
FIG. 23 is a block diagram of a network system including an auxiliary power supply, according to an embodiment of the inventive concept.

FIG. 23 is a block diagram of a network system NSYS including an auxiliary power supply APS, according to an embodiment of the inventive concept. Referring to FIG. 23, a solid state drive SSD including the auxiliary power supply APS may be included in a server system SSYS connected in the network system NSYS. When an SPO occurs in a main power supply (not shown), the server system SSYS may operate by using auxiliary power stored in the auxiliary power supply APS. The network system NSYS may include the server system SSYS and a plurality of terminals TEM1 through TEMn, which are connected to a network. The server system SSYS may include a server SERVER for processing a request received from the terminals TEM1 through TEMn, and the solid state drive SSD for storing data DTA1 through DTAn corresponding to the request received from the terminals TEM1 through TEMn. In this case, the solid state drive SSD illustrated in FIG. 23 may be the solid state drive SSD illustrated in FIG. 22. That is, the solid state drive SSD illustrated in FIG. 23 may include the SSD controller SCTL and the flash memory MEM illustrated in FIG. 22.

Figure 24:
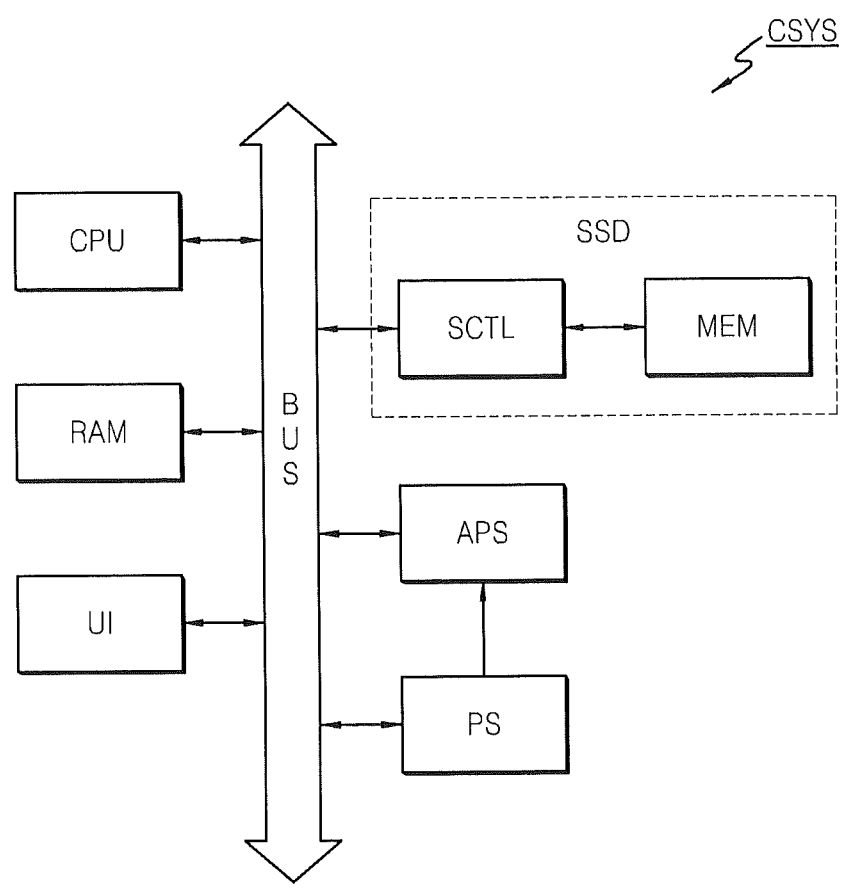
FIG. 24 is a block diagram of a computing system according to an embodiment of the inventive concept.

FIG. 24 is a block diagram of a computing system CSYS according to an embodiment of the inventive concept. Referring to FIG. 24, the computing system CSYS includes a power supply PS that is a main power supply, an auxiliary power supply APS, a processor CPU, a user interface UI, and a solid state drive SSD, which are electrically connected to a bus BUS. The solid state drive SSD includes an SSD controller SCTL and a flash memory MEM. N-bit data (N is an integer equal to or greater than 1) processed or to be processed by the processor CPU may be stored in the flash memory MEM by the control of the SSD controller SCTL. The solid state drive SSD illustrated in FIG. 24 may be the solid state drive SSD illustrated in FIG. 22. When an SPO occurs in the power supply PS, the computing system CSYS may operate by using auxiliary power stored in the auxiliary power supply APS. The computing system CSYS may further include system memory such as random access memory RAM. If the computing system CSYS is a mobile device, a battery for supplying an operation voltage of the computing system CSYS and a modem such as a baseband chipset may be additionally provided. Also, it will be understood by one of ordinary skill in the art that the computing system CSYS may further include an application chipset, a camera image processor (CIS), mobile dynamic random access memory (DRAM), and the like, and thus detailed descriptions thereof will not be provided here.

Since an auxiliary power supply loses a function of providing auxiliary power if a capacitor included in the auxiliary power supply does not operate normally, it is important to efficiently monitor the state of the capacitor. In a solid state drive included in a server system, it is expected that the number of flash channels is increased and the auxiliary power supply may include a plurality of capacitors in order to cover increased peak power. Accordingly, the reliability and lifetime of the auxiliary power supply including a plurality of capacitors need, to be improved.

According to an embodiment of the inventive concept, an auxiliary power supply capable of efficiently monitoring and controlling the state of a capacitor may be provided. By simply and accurately monitoring the state of the capacitor, an error capacitor may be replaced. Thus, the reliability of the auxiliary power supply may be improved and the lifetime of the auxiliary power supply may be extended. A capacitor state determination unit included in the auxiliary power supply needs to merely determine whether a detection signal is toggled and whether the detection signal is in a low state or a high state. Accordingly, the capacitor state determination unit may be simply realized and thus overheads of a whole system may be reduced.

If a timer is used, a period for determining the state of the capacitor by determining whether toggling is performed may be variously set, and a determination unit may rapidly determine whether an error occurs in the capacitor, merely based on whether the timer is reset. Also, the auxiliary power supply may efficiently monitor the state of a plurality of capacitors connected in series and/or in parallel.

Even in a case when a charge circuit unit continuously supplies charge power as well as a case when the charge circuit unit discontinuously supplies the charge power, the auxiliary power supply may efficiently monitor the state of the capacitor. While the inventive concept has been particularly shown and described with reference to exemplary embodiments thereof, it will be understood that various changes in form and details may be made therein without departing from the spirit and scope of the following claims.

What is claimed is:

1. An auxiliary power supply, comprising:
   a capacitor;
   a capacitor charging circuit configured to provide a charging current to a first terminal of said capacitor; and
   a capacitor monitoring circuit comprising a resistor having a first terminal electrically coupled to a second terminal of said capacitor and a comparator having a first input terminal electrically coupled to the first terminal of the resistor, said capacitor monitoring circuit configured to detect when said capacitor is malfunctioning in an open condition and when said capacitor is malfunctioning in a short condition.

2. The auxiliary power supply of claim 1, wherein the comparator has a second input terminal electrically coupled to a second terminal of the resistor.

3. The auxiliary power supply of claim 2, wherein said capacitor monitoring circuit is configured to detect when said capacitor is malfunctioning in an open condition by detecting when a voltage across the first and second input terminals of said comparator has been continuously maintained at or below a first threshold voltage level during a first measurement time interval; and wherein said capacitor monitoring circuit is configured to detect when said capacitor is malfunctioning in a short condition by detecting when the voltage across the first and second input terminals of said comparator has been continuously maintained at or above a second threshold voltage level during a second measurement time interval.

4. The auxiliary power supply of claim 3, wherein said capacitor monitoring circuit further comprises a determination circuit electrically coupled to an output of the comparator; and wherein the determination circuit is configured to detect when the output of the comparator is being toggled between unequal voltage levels.

5. An auxiliary power supply comprising:
   a capacitor;
   a charge circuit unit for controlling charge power supplied to the capacitor; and
   a monitoring unit for monitoring a state of the capacitor, wherein the monitoring unit comprises:
   a resistor connected in series to the capacitor; and
   a capacitor state determination unit for determining the state of the capacitor based on a difference between voltages of two terminals of the resistor.

6. The auxiliary power supply of claim 5, wherein the capacitor state determination unit comprises:
   a comparator for comparing first and second voltages that are the voltages of the two terminals of the resistor, and outputting a detection signal; and
   a determination unit for determining the state of the capacitor based on the detection signal.

7. The auxiliary power supply of claim 6, wherein the determination unit:
   determines the state of the capacitor as a normal state if the detection signal is toggled,
   determines the state of the capacitor as an open state if the detection signal is in a low state, and
   determines the state of the capacitor as a short state if the detection signal is in a high state.

8. The auxiliary power supply of claim 7, wherein the charge circuit unit discontinuously supplies the charge power.

9. The auxiliary power supply of claim 8, wherein the charge circuit unit:
   blocks the charge power if a charge amount of the capacitor reaches a first charge amount, and
   supplies the charge power if the charge amount of the capacitor reaches a second charge amount less than the first charge amount.

10. The auxiliary power supply of claim 6, further comprising:
    a second line in which a second capacitor and a second resistor are connected in series and which is connected in parallel to a first line in which the capacitor and the resistor are connected in series; and
    a second comparator for comparing third and fourth voltages that are voltages of two terminals of the second resistor, and outputting a second detection signal,
    wherein the capacitor state determination unit determines a state of the second capacitor based on the second detection signal.

11. The auxiliary power supply of claim 6, wherein the capacitor comprises a plurality of capacitors connected in series.

12. The auxiliary power supply of claim 6, wherein the determination unit:
    determines the state of the capacitor as a normal state if the number of times that the detection signal is toggled in an operation period of a timer is equal to or greater than a reference value,
    determines the state of the capacitor as an open state if the detection signal is in a low state, and
    determines the state of the capacitor as a short state if the detection signal is in a high state.

13. The auxiliary power supply of claim 12, wherein the timer:
    is started after a stored charge amount of the capacitor reaches a first charge amount, and
    is restarted if the state of the capacitor is determined as a normal state.

14. The auxiliary power supply of claim 5, wherein the capacitor is a super capacitor.

15. A user device comprising:
    a storage device;
    a main power supply for supplying power to the storage device; and
    an auxiliary power supply for supplying auxiliary power to the storage device if the power supplied from the main power supply is blocked,
    wherein the auxiliary power supply comprises:
    a capacitor;
    a charge circuit unit for controlling the power supplied from the main power supply, and supplying charge power to the capacitor;
    a resistor connected in series to the capacitor; and
    a capacitor state determination unit for monitoring a state of the capacitor based on a detection signal generated according to a difference between voltages of two terminals of the resistor.

16. The user device of claim 15, wherein the determination unit:
    determines the state of the capacitor as a normal state if the detection signal is toggled,
    determines the state of the capacitor as an open state if the detection signal is in a low state, and
    determines the state of the capacitor as a short state if the detection signal is in a high state.

17. The user device of claim 16, wherein the detection signal:
    is in a low state if the difference between the voltages of the two terminals of the resistor is equal to or less than a reference value, and
    is in a high state if the difference between the voltages of the two terminals of the resistor is greater than the reference value.

18. The user device of claim 15, wherein the storage device is a solid state drive.

19. The user device of claim 15, wherein the storage device is comprised in a server.

* * * * *